US012270236B2

(12) United States Patent
Procton et al.

(10) Patent No.: US 12,270,236 B2
(45) Date of Patent: Apr. 8, 2025

(54) SLIDING DOOR UNIT AND COMPONENTS FOR THE SAME

(71) Applicant: Endura Products, LLC, Colfax, NC (US)

(72) Inventors: Bruce Procton, Greensboro, NC (US); Michael K. Mitchell, Winston-Salem, NC (US); Tomasz Jaskiewicz, Oak Ridge, NC (US)

(73) Assignee: ENDURA PRODUCTS, LLC, Colfax, NC (US)

( * ) Notice: Subject to any disclaimer, the term of this patent is extended or adjusted under 35 U.S.C. 154(b) by 1042 days.

(21) Appl. No.: 17/220,991

(22) Filed: Apr. 2, 2021

(65) Prior Publication Data

US 2021/0222473 A1 Jul. 22, 2021

Related U.S. Application Data

(63) Continuation of application No. 16/001,029, filed on Jun. 6, 2018, now Pat. No. 10,988,965, which is a (Continued)

(51) Int. Cl.
*E05D 15/06* (2006.01)
*E05B 15/00* (2006.01)
(Continued)

(52) U.S. Cl.
CPC ...... *E05D 15/0608* (2013.01); *E05B 15/0205* (2013.01); *E05B 15/024* (2013.01);
(Continued)

(58) Field of Classification Search
CPC .... E05B 65/0858; E05B 65/08; E05B 65/087; E05B 63/0052; E05C 9/04; E05C 3/34;
(Continued)

(56) References Cited

U.S. PATENT DOCUMENTS 257,401 A 5/1882 Somers
902,412 A * 10/1908 Jones ...................... E05C 9/043 292/38
(Continued)

FOREIGN PATENT DOCUMENTS

CN 103477010 A 12/2013
DE 102007021979 B3 8/2008
(Continued)

OTHER PUBLICATIONS

Canadian Office Action for Canadian Serial No. 3007415, dated Mar. 11, 2019, 4 pgs.
(Continued)

*Primary Examiner* — Christine M Mills
*Assistant Examiner* — Faria F Ahmad
(74) *Attorney, Agent, or Firm* — CANTOR COLBURN LLP

(57) ABSTRACT

A sliding door unit has a mounting frame and an active door panel mounted in and capable of sliding relative to the mounting frame. The active door panel has a face including a panel portion and a glazing portion. The glazing portion comprises less than 65% of a surface area of the face.

10 Claims, 25 Drawing Sheets

Related U.S. Application Data continuation of application No. 16/000,420, filed on Jun. 5, 2018, now Pat. No. 10,982,477.

(60) Provisional application No. 62/517,398, filed on Jun. 9, 2017.

(51) Int. Cl.

| | |
|---|---|
| ***E05B 15/02*** | (2006.01) |
| ***E05B 63/08*** | (2006.01) |
| ***E05B 63/10*** | (2006.01) |
| ***E05B 63/12*** | (2006.01) |
| ***E05B 65/08*** | (2006.01) |
| ***E05C 9/04*** | (2006.01) |
| ***E06B 3/36*** | (2006.01) |
| ***E06B 3/46*** | (2006.01) |

(52) U.S. Cl.

CPC .............. *E05B 63/10* (2013.01); *E05B 63/12* (2013.01); *E05B 65/0835* (2013.01); *E05B 65/0858* (2013.01); *E05C 9/04* (2013.01); *E05D 15/0665* (2013.01); *E05D 15/0669* (2013.01); *E05D 15/0686* (2013.01); *E05D 15/0691* (2013.01); *E06B 3/4636* (2013.01); *E05B 15/0006* (2013.01); *E05B 63/08* (2013.01); *E05Y 2201/684* (2013.01); *E05Y 2900/132* (2013.01); *E06B 3/365* (2013.01)

(58) Field of Classification Search

CPC ... E05C 9/041; E05C 7/06; E05C 7/04; Y10S 292/21

See application file for complete search history.

(56) References Cited

U.S. PATENT DOCUMENTS 1,047,900 A * 12/1912 Voight .................... E05B 63/20 292/DIG. 21
1,124,372 A * 1/1915 Willich ................... E05C 9/043 292/DIG. 21
1,208,565 A 12/1916 Johnson
1,438,233 A * 12/1922 Hammann .............. E05C 9/043 292/DIG. 21
1,574,023 A 2/1926 Crompton et al.
2,108,359 A * 2/1938 Accardi .................... E05C 9/04 292/DIG. 31
2,253,495 A 8/1941 Cordrey
2,406,459 A * 8/1946 Gibson ..................... E05C 9/04 292/39
2,787,154 A * 4/1957 Wesberry ................ E05C 9/041 70/118
3,040,391 A 6/1962 Saunders
3,046,776 A 7/1962 Marotto
3,126,727 A 3/1964 Pillard et al.
3,594,031 A 7/1971 Ford
3,633,389 A * 1/1972 Horgan, Jr. ............... E05C 9/04 70/120
3,904,229 A * 9/1975 Waldo ................... E05B 65/087 292/108
3,919,808 A * 11/1975 Simmons .................. E05C 7/04 49/367
4,146,994 A * 4/1979 Williams .................. E05C 7/04 49/386
4,453,345 A 6/1984 Maus
4,500,120 A 2/1985 Ridgewell
4,641,865 A * 2/1987 Pastva ..................... E05B 83/01 292/DIG. 57
4,643,005 A * 2/1987 Logas ..................... E05C 9/026 70/95
4,973,091 A * 11/1990 Paulson .................. E05C 9/042 292/216
5,189,837 A 3/1993 Ienaga
5,193,861 A 3/1993 Juga et al.
5,520,423 A 5/1996 Finkelstein
5,544,924 A 8/1996 Paster
5,590,919 A * 1/1997 Germano ................ E06B 3/365 292/DIG. 21
5,901,989 A * 5/1999 Becken ..................... E05C 7/06 292/DIG. 21
5,951,068 A * 9/1999 Strong .................... E05C 9/041 292/29
6,108,989 A 8/2000 Kordes
6,230,528 B1 5/2001 Don
6,474,118 B2 11/2002 Martinez
6,497,072 B2 12/2002 Fries
6,637,784 B1 10/2003 Hauber
6,826,867 B1 12/2004 McDonald
7,293,389 B2 11/2007 Jacobs
7,377,076 B2 5/2008 Shedd
7,735,882 B2 6/2010 Abdollahzadeh et al.
7,836,737 B2 11/2010 Lin
8,161,779 B2 4/2012 Bergmann
8,375,645 B2 2/2013 Wauchi et al.
8,381,444 B1 2/2013 McDonald
8,905,443 B2 12/2014 Alber
9,003,841 B2 4/2015 Koh
9,309,696 B2 4/2016 Friese
9,316,021 B2 4/2016 Burciaga
9,376,849 B2 6/2016 Lim
9,428,940 B1 * 8/2016 Patrick ...................... E05C 1/16
9,470,028 B2 10/2016 Header
9,540,843 B2 1/2017 Garrett
9,605,461 B2 3/2017 Zimmer
9,790,716 B2 10/2017 Hagemeyer
9,988,830 B2 6/2018 Raz
10,077,588 B1 9/2018 Header
10,278,547 B2 5/2019 Morin
10,538,947 B2 1/2020 Boring
10,982,477 B2 4/2021 Procton et al.
10,988,965 B2 4/2021 Procton et al.
2010/0050530 A1 3/2010 Blasi
2013/0015674 A1 1/2013 He
2016/0108650 A1 4/2016 Hagemeyer et al.
2016/0194903 A1 7/2016 White
2018/0058105 A1 3/2018 Van Klompenburg
2018/0355648 A1 12/2018 Procton et al.
2018/0355649 A1 12/2018 Procton et al.
2019/0119952 A1 4/2019 Jaskiewicz
2019/0360260 A1 11/2019 Hunter
2020/0224468 A1 * 7/2020 Horwood ................ E05C 9/042
2022/0018169 A1 * 1/2022 Lai .......................... E05C 9/063
2022/0235473 A1 * 7/2022 Miyajima ................. C25B 1/04

FOREIGN PATENT DOCUMENTS

DE 102010061173 B3 1/2012
DE 102013109272 A1 3/2015
DE 102009061095 B3 2/2016
GB 452535 A 8/1936
KR 101610319 B1 4/2016
WO 2009115140 A1 9/2009

OTHER PUBLICATIONS

Sierra Pacific Windows, http://www.sierrapacificwindows.com/patio-sliding-doors.cfm, known at least as early as Mar. 4, 2017, 1 pg.

Marvin Windows and Doors, "Built Around You, Remodeling & Replacement Solutions," https://urldefense.proofpoint.com/v2/url?u=http-3A_pdf.archiexpo.com_pdf_-marvin_remodeling-2Dreplacement-2Dsolutions_9530-2D308205.html, known at least as early as2016, 13 pgs.

<http://www.sierrapacificwindows.com/patio-sliding-doors.cfm> Knowsn as early as Mar. 4, 2017.

<http://www.bing.com/images/search?view=detailV2&ccid=KQDWI9Nm&pccid=J5pUkM5A&id=87E74B513AB215B3894C8EFC336797D1F8C422D7&pmid=A2139E4C474B919F8FDAEF77860EE1B81D610C6D&q=sliding+entryway+door&qpvt=Interior+Sliding+French+Doors&psimid=

(56) References Cited

OTHER PUBLICATIONS

608020173380848064&ppageurl=http%3a%2f%2fyourlocalsecurity.com%2fblog%2f2012%2f09%2f18%2fsecuring-the-vulnerable-entry-points-in-your-home%.

* cited by examiner

SLIDING DOOR UNIT AND COMPONENTS FOR THE SAME

CROSS-REFERENCE TO RELATED APPLICATIONS

This application is a continuation of U.S. patent application Ser. No. 16/001,029, filed Jun. 6, 2018, which is a continuation of U.S. patent application Ser. No. 16/000,420, filed Jun. 5, 2018, which claims the benefit of, and priority to, U.S. Provisional Patent Application Ser. No. 62/517,398, filed Jun. 9, 2017. The entire contents of each of the above applications are hereby incorporated by reference.

FIELD OF THE DISCLOSURE

The present disclosure relates to sliding doors. In some embodiments the sliding doors are parallel sliding doors. The present disclosure also relates to hardware used to open, close, and secure a sliding door in a closed position.

BACKGROUND

Builders and contractors often include sliding door assemblies as part of the construction of homes and businesses for permitting ingress or egress from a building. FIG. 1 shows a typical sliding door 10. Each door panel 11 includes a narrow frame 12 with a significant area of glazing 13.

Sliding doors 10 are often used for ingress and egress to a patio or deck. Sliding doors 10 often provide the benefit of functioning as a large window when closed. Sliding doors 10 may also be preferred to hinged doors because sliding doors require less clearance into a room than a hinged door because the door panels 11 do not swing into the room while being opened.

The most common sliding doors 10 have a fixed panel 14 and an active panel 15. These panels 14, 15 are positioned within a mounting frame 16 to be parallel and offset from each other. This allows the active panel 15 to bypass the fixed panel 14 as the active panel slides between a closed position and an open position.

Sliding doors 10 typically include locking hardware (not shown) and handles 17 that are distinct from the hardware used on hinged door panels because the locking hardware of the sliding door assembly must prevent separation of the active panel 15 from the mounting frame 16 in a direction along the plane of the door panel instead of in a direction substantially perpendicular to the face of the door panel. One drawback of using dedicated handles and locking hardware for sliding doors 10 is that the hardware may not be as readily available through typical retail outlets as other knobs, levers, or thumb-turn hardware used on hinged doors.

FIG. 2 shows a typical hinged door 20. Even when glazed, hinged door panels 22 include a significantly wider stile portion 24 than the frame 12 of the conventional sliding door panels 11 shown in FIG. 1. As a result, the glazing portion 25 of the hinged door panel 22 is a significantly lower percentage of the surface area of the face of the hinged door panel 22 then found in typical sliding door panels 11 (FIG. 1). This glazing difference results in a distinct appearance for each type of door panel. A hinged door panel 22 also typically includes apertures (not shown) for a cylindrical latch and a cylindrical deadbolt extending into the free edge of the door panel. A hinged door panel 22 often also includes a first bore intersecting the latch aperture for use by a knob or lever 26 on either side. A second bore is provided through the face of the hinged door panel 22 to intersect the deadbolt aperture for use by a key cylinder 28 or thumb turn.

In addition to differences in the availability of the panel and hardware components themselves, the differences between typical hinged doors and typical sliding doors leads pre-hung hinged doors to be made by different manufacturers than sliding door units.

The present disclosure describes a sliding door unit, and components therefore, that allow for increased options for the consumer by integrating aspects of typical sliding doors with aspects of typical hinged doors.

SUMMARY

In one embodiment, the present disclosure describes a sliding door unit comprising a mounting frame and an active door panel mounted in and capable of sliding relative to the mounting frame. The active door panel has a face including a panel portion and a glazing portion. The glazing portion comprises less than 65% of a surface area of the face.

In another embodiment of the present disclosure, a sliding door unit is described that includes a mounting frame and an active door panel mounted in and capable of sliding relative to the mounting frame. The active door panel has a face including a panel portion and a glazing portion. The glazing portion comprises less than 65% of a surface area of the face. The panel portion includes a pair of bores extending perpendicular to the face adjacent to a first side edge of the active door panel. A pair of apertures extend from the first side edge into communication with the pair of bores respectively.

Other embodiments of the present disclosure include an active door panel for a sliding door unit that comprises a face including a panel portion and a glazing portion, a pair of bores extending perpendicular to the face adjacent to a first side edge of the active door panel, a pair of apertures extending from the first side edge into communication with the pair of bores respectively, a mortise groove adjacent to each corner of the face, and a guide roller assembly disposed within each mortise groove. The guide roller assembly is configured to permit sliding between the active door panel and a mounting frame, and the glazing portion comprises less than 65% of a surface area of the face.

These and other aspects of the present invention will become apparent to those skilled in the art after a reading of the following description of the preferred embodiments, when considered in conjunction with the drawings. It should be understood that both the foregoing general description and the following detailed description are explanatory only and are not restrictive of the invention as claimed.

DETAILED DESCRIPTION OF THE DRAWINGS

Exemplary embodiments of this disclosure are described below and illustrated in the accompanying figures, in which like numerals refer to like parts throughout the several views. The embodiments described provide examples and should not be interpreted as limiting the scope of the invention. Other embodiments, and modifications and improvements of the described embodiments, will occur to those skilled in the art and all such other embodiments, modifications and improvements are within the scope of the present invention. Features from one embodiment or aspect may be combined with features from any other embodiment or aspect in any appropriate combination. For example, any individual or collective features of method aspects or embodiments may be applied to apparatus, product or component aspects or embodiments and vice versa.

Figure 3:
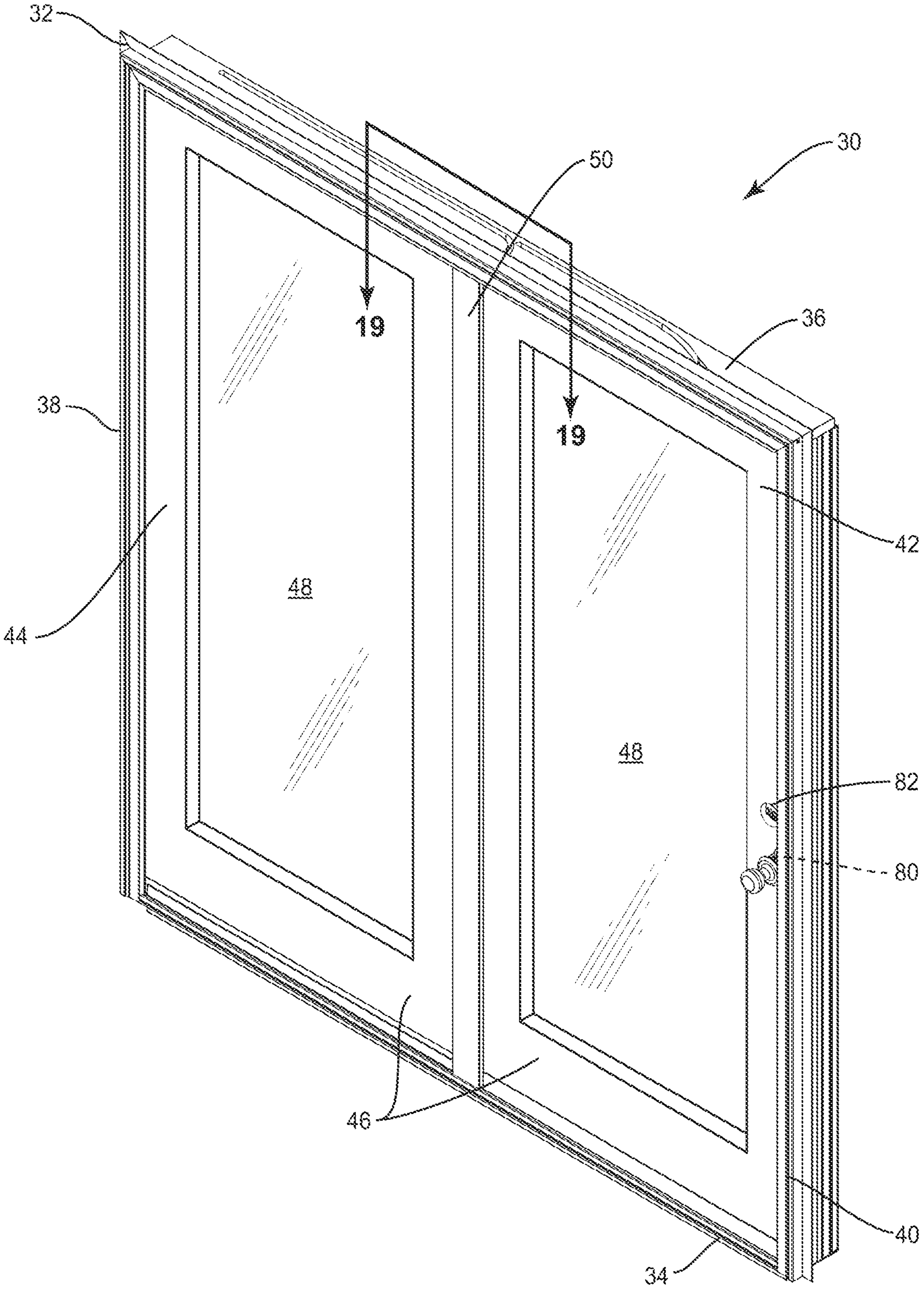
FIG. 3 is a sliding door unit according to an embodiment of the present disclosure in a closed position.
Figure 4:
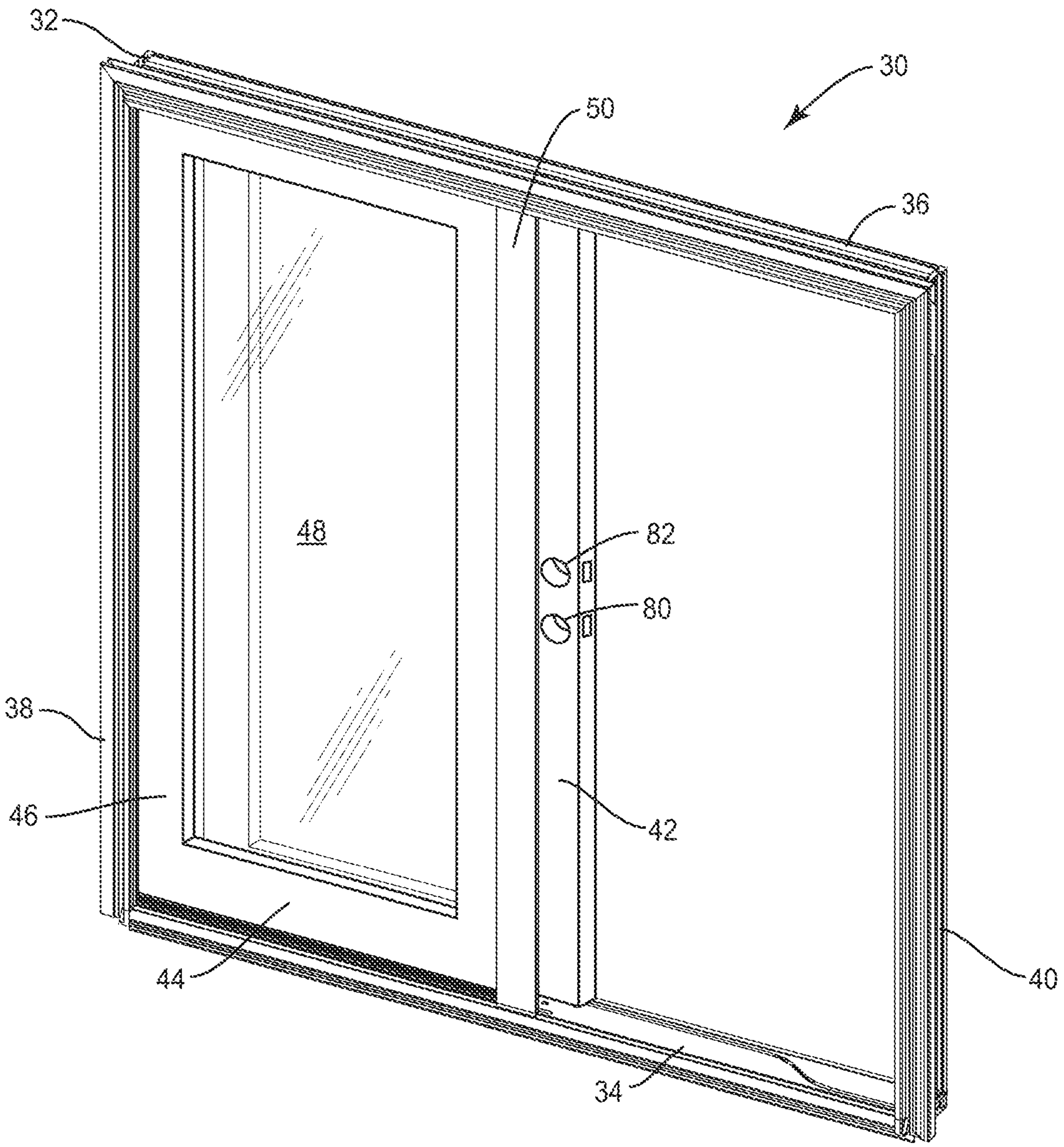
FIG. 4 is the sliding door unit of FIG. 3 in an open position.

FIGS. 3 and 4 show a sliding door unit 30 according to one embodiment of the present disclosure. A mounting frame 32 with a sill 34, a header 36, a passive side jamb 38, and an active side jamb 40 are included in the sliding door unit 30. The illustrated embodiment includes an active door panel 42 mounted for sliding relative to the mounting frame 32, and a fixed door panel 44 fixedly mounted within the mounting frame 32. The door panels 42, 44 may each include a panel portion 46 and a glazing portion 48. The panel portion 46 may extend around the periphery of the glazing portion 48, but the panel portion may also include additional portions that divide the glazing portion into distinct sections. The panel portion 46 may be constructed from wood, steel, fiberglass or other materials so long as the panel portion 46 is not a glazing, i.e. translucent or transparent, material, such as glass. One or more astragals 50 may be provided to bridge a gap between the active door panel 42 and the fixed door panel 44 when the active door panel is in a closed position relative to the mounting frame 32. The closed position of the active door panel 42 may also be referred to as the closed position of the sliding door unit 30. Motion of the active door panel 42 relative to the mounting frame 32 is discussed further below. Embodiments of the sliding door unit 30 that include more than one active door panel 42 are contemplated. Embodiments of the sliding door unit 30 without a passive door panel 44, or embodiments with multiple passive door panels, also are contemplated.

Figure 5:
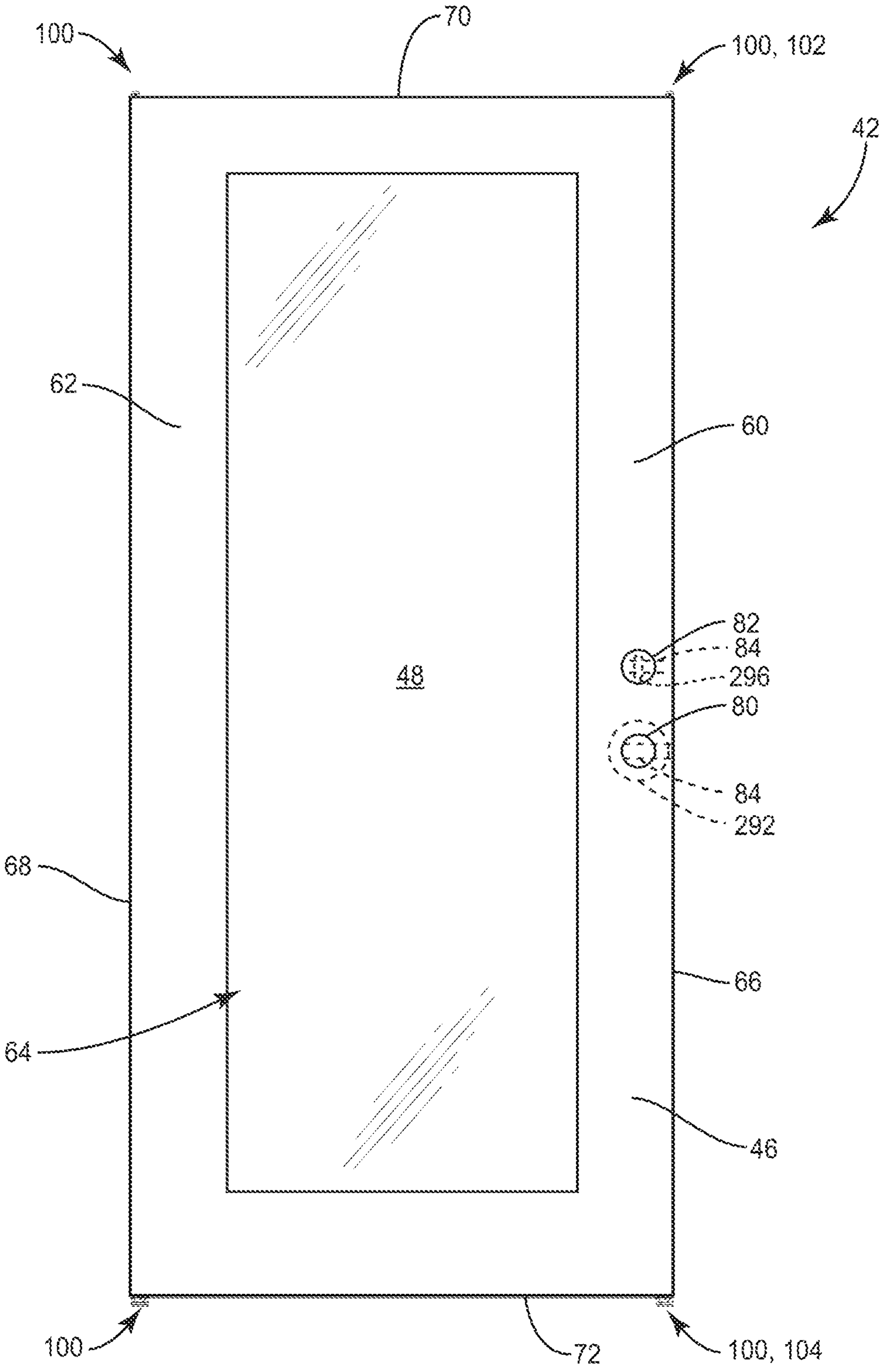
FIG. 5 is a front view of an active door panel for a sliding door unit according to an embodiment of the present disclosure.

FIG. 5 shows an example of an active door panel 42 according to an embodiment of the present disclosure. The active door panel 42 includes a panel portion 46, which may be constructed from at least an outward stile 60 and an inward stile 62. The term "outward" references the relative location of the stile relative to the mounting frame 32 (FIG. 3) when the active door panel 42 is in the closed position. Particularly, an "outward" element is positioned relatively toward the periphery of the mounting frame 32 and an "inward" element is positioned relatively toward the center of the mounting frame. The term "outward" is used solely to assist with clarity of this description, and is not intended to limit the scope of the present disclosure except where expressly set forth in the claims.

Selectively positioned within the panel portion 46, the active door panel 42 may include a glazing portion 48. The panel portion 46 and the glazing portion 48 provide the face 64 of the active door panel 42. The active door panel 42 also includes an outer edge 66, an inner edge 68, a top edge 70 and a bottom edge 72. Again, the terms "outer" and "inner" are used with respect to the corresponding stiles 60, 62 and the mounting frame 32. The terms "outer" and "inner" are used solely to assist with the clarity of the disclosure and are not intended to limit the scope of the embodiments described herein.

According to one embodiment of the present disclosure, at least the active door panel 42 is configured to be suitable for use as a hinged door panel. As used herein, a door panel is "suitable for use as a hinged door panel" if the door panel meets one or both of the following tests:

1. The panel has at least a latch bore 80, and may optionally have a deadbolt bore 82. A latch bore 80 passes through the face 64 of the active door panel 42, such as through the outward stile 60, and may intersect an aperture 84 formed perpendicular to the outer edge 66 of the door panel. The aperture 84 is suitable for housing a conventional cylindrical latch of a hinged door. A deadbolt bore 82 may also pass through the face 64 of the active door panel 42, such as through the outward stile 60 and adjacent to the latch bore 80, and may intersect an aperture 84 formed perpendicular to the outer edge 66 of the door panel. The aperture 84 intersecting the deadbolt bore 82 may be suitable for housing a conventional cylindrical deadbolt of a hinged door. In one example, a standard deadbolt bore 82 (and latch bore 80) may have a diameter of approximately 2.125", and the center of the deadbolt bore may be backset either about 2.375" or about 2.75" from the adjacent edge. These dimensions can accommodate a conventional cylindrical deadbolt that has a housing that is approximately 3.5" in length. The frame of a prior art sliding door would not have sufficient width to accommodate a deadbolt bore 82 according to the typical size and backset thereof 2. Additionally or alternatively, a door panel is suitable for use as a hinged door panel if the glazing portion 48 comprises less than approximately 65% of the surface area of the face 64 of the door panel. For example, existing residential entryway doors with "full glazing" that are designed for being hung with hinges typically have between about 45% and about 60% glazing, e.g. glass, surface area compared to the surface area of the door panel as a whole. Compared to popular hinged door panels, popular sliding door panels on the market have between about 67% and about 85% glazing as a percentage of the surface area of the face 64 of the panel. To determine the area of glazing, the sum of the areas of glazing, i.e. transparent or translucent portions, of the door is divided by the total area of the face 64, which is calculated as the product of the width and the height of the door panel. Each area of glazing is calculated with the mathematical assumption that the glazing is a flat surface and omits consideration of an increase in actual surface area that may result from surface roughness such as etching or surface contour such as concave or convex portions or the inclusion of prisms. The percentage of glazing as a percentage of the surface area of the face 64 as defined above takes the mathematical assumption that the face 64 as a whole is a flat plane, and does not take into account the slight variations in surface area that may result from the inset of the glazing portion(s) 48 relative to the panel portion 46, or the surface detail of any frame or molding between the glazing portion(s) and the panel portion. The glazing percentage definition omits consideration of any bores in the face 64. The glazing percentage definition accounts for the possibility that the door panel may comprise more than one distinct area of glazing separated by opaque portions of the door panel.

Based upon the preceding definition of suitability for use as a hinged door panel, both the active door panel 42 and the fixed door panel 44 shown in FIG. 3 would be considered suitable for use as a hinged door panel. The active door panel 42 meets both the glazing test and the pre-bored test, while the fixed door panel 44 would meet the glazing test. The active door panel 42 shown in FIG. 5 has about 55% glazing as a percentage of the surface area of the face 64.

A door panel that is suitable for use as a hinged door may be pre-constructed to integrate into a sliding door unit 30. Alternatively, a door panel that is suitable for use as a hinged door panel may be adapted for use within a sliding door unit 30. One adaptation may include mounting an astragal 50 (FIG. 3) to the inner edge 68 of the active door panel 42. More details of the astragal 50 are discussed below. A second adaptation may include forming one or more mortise grooves 90 (FIG. 6) for receiving respective guide roller assemblies 100 that permit smooth, restrained sliding motion between the active door panel 42 and the mounting frame 32 (FIG. 3).

In the illustrated embodiment of FIG. 5, the active door panel 42 comprises four guide roller assemblies 100. As shown in FIG. 5, and as will be described in detail layer, the roller assemblies 100 are each disposed in a mortise groove 90 formed at the intersection of a side edge, e.g. the outer and inner edges 66, 68, with respective top and bottom edges 70, 72 of the active door panel 42. Disposing the guide roller assemblies 100 within mortise grooves 90 positions the guide roller assemblies to be easily accessible along respective outer and inner edges 66, 68 of the active door panel 42. Access to the guide roller assemblies 100 is beneficial because the guide roller assemblies can be adjustable to ensure a proper fit and retention between the active door panel 42 and the mounting frame 32 as discussed in more detail below. Alternatively, the guide roller assemblies 100 may be adjustable through the face 64 of the active door panel 42, such as via an access port (not shown). An access port may be more likely where the guide roller assemblies 100 are mounted to the active door panel 42 at positions away from the outer and inner edges 66, 68.

Figure 6:
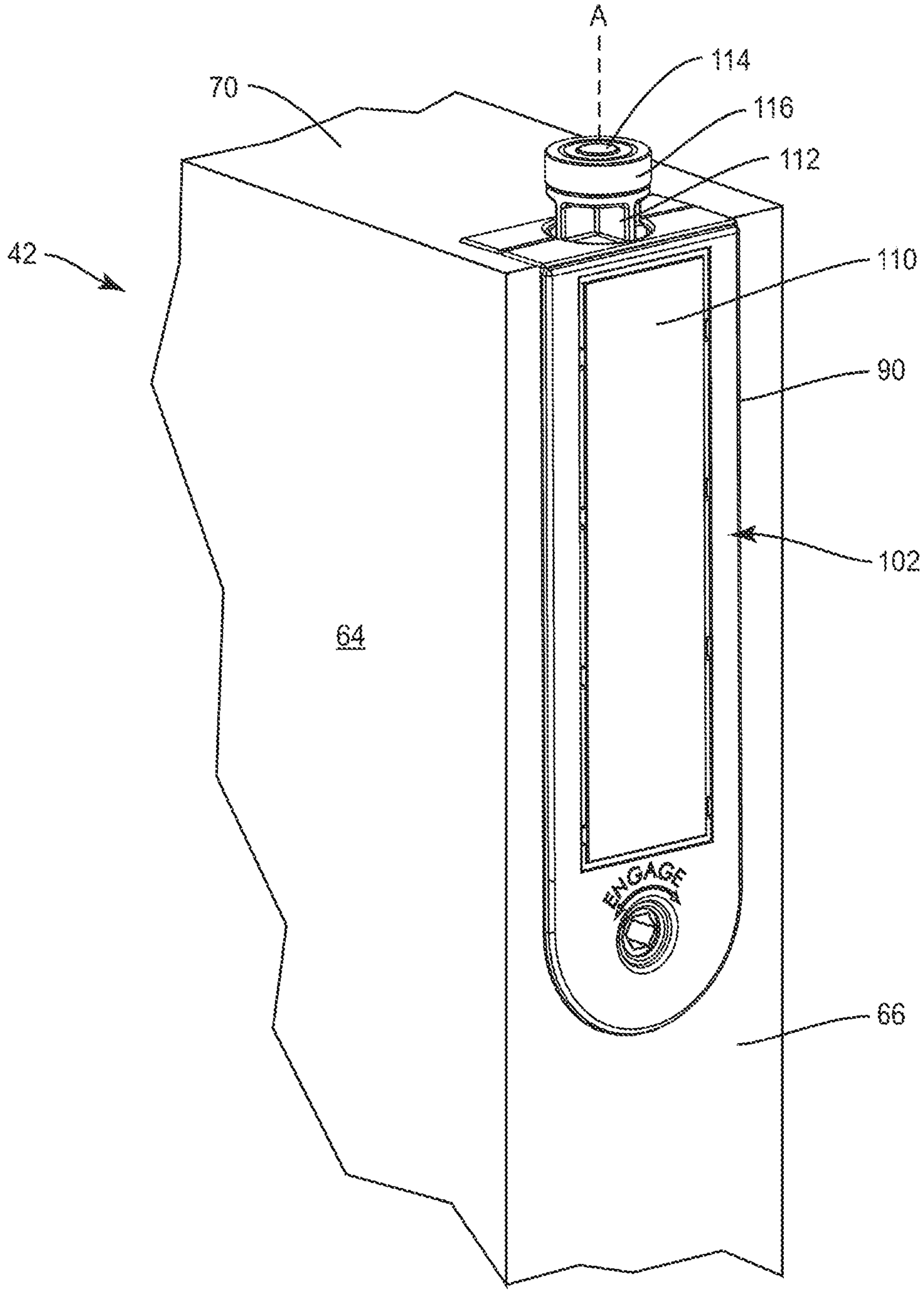
FIG. 6 is a detailed perspective view of a top corner of the active door panel of FIG. 5.
Figure 7:
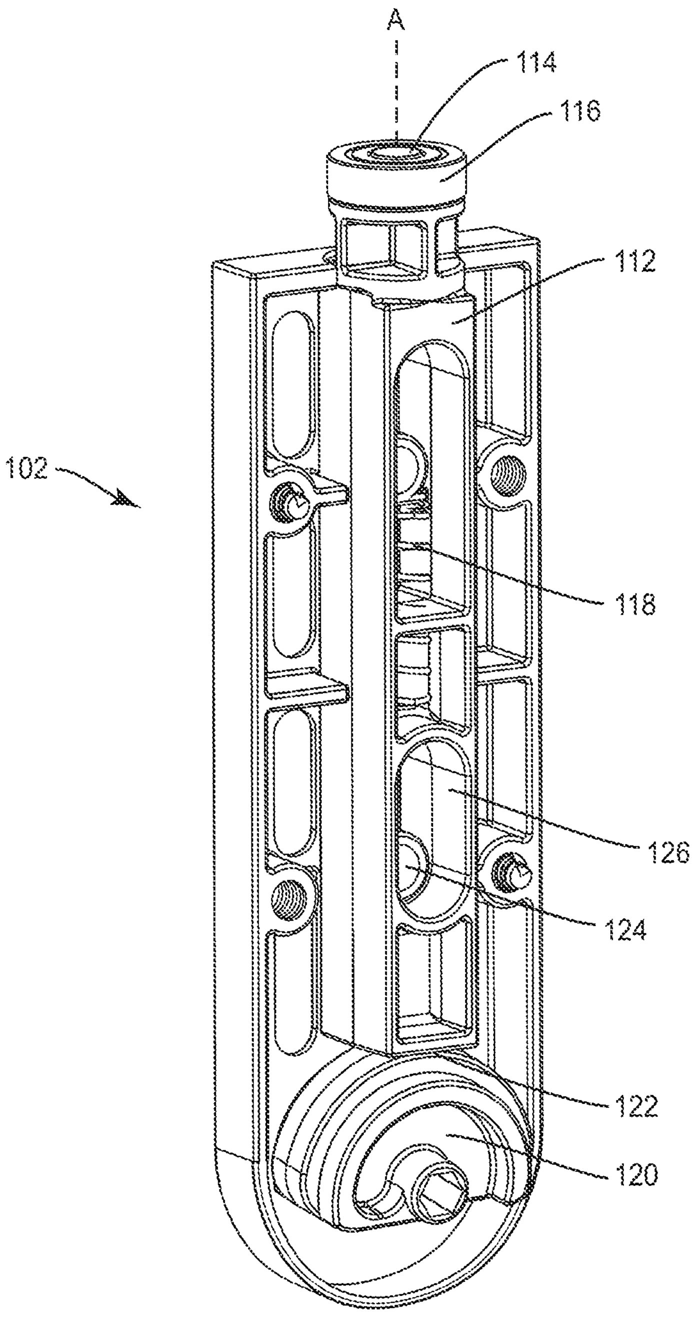
FIG. 7 is a detailed view of a top guide roller assembly.

In the illustrated embodiment of FIG. 5, the active door panel 42 includes a pair of top guide roller assemblies 102 and a pair of bottom guide roller assemblies 104. The top guide roller assemblies 102 may be configured primarily for retaining the active door panel 42 as the door panel travels along a designed path of motion relative to the mounting frame 32 (FIG. 3). Therefore, the top guide roller assemblies 102 may not need to bear the load of the active door panel 42. FIGS. 6 and 7 provide detailed views of a top guide roller assembly 102. FIG. 6 shows the mortise groove 90 formed at the intersection of the top edge 70 and the outer edge 66. As used herein, the term "edge" includes the respective surface extending between the faces 64 of the door panel.

FIG. 6 also shows that the top guide roller assembly 102 may include a housing 110 configured to fit in the pocket formed by the mortise groove 90. The top guide roller assembly 102 also may include a guide pin 112. A top distal end 114 of the guide pin 112 may be capable of extending perpendicular to the top edge 70 of the active door panel 42. The top guide roller assembly 102 is adjustable to change the magnitude of extension of the guide pin 112 from the top edge 70. In one embodiment, the top distal end 114 of the guide pin 112 may be capable of being flush with the top edge 70. This flush arrangement may be beneficial when shipping the active door panel 42 separate from the mounting frame 32, or for use when first installing the active door panel into the mounting frame.

A roller bearing 116 may be disposed around the guide pin 112 near the top distal end 114 thereof. The roller bearing 116 may be configured to rotate about a vertical axis of rotation A when the active door panel 42 is mounted within the mounting frame 32. The roller bearing 116 is configured to reduce friction between the top roller guide 102 and the mounting frame 32 during sliding of the active door panel 42.

As shown in FIG. 7, the guide pin 112 may be biased toward a retracted position by a spring 118. To extend the guide pin 112 and adjust the magnitude of extension thereof relative to the top edge 70 of the door panel (FIG. 6), a cam 120 is rotatably mounted within the housing 110. A tool, such as a hex-head wrench may be configured to access the cam 120 from the outer edge 66 (FIG. 6) of the door panel. Rotating of the cam 120 may abut an interior end 122 of the guide pin 112 and apply a force opposite the biasing force of the spring 118 to extend the guide pin 112. Due to the variable radius of the cam 120, adjusting the orientation of the cam relative to the guide pin 112 may allow fine adjustment of the position of the roller bearing 116 relative to the top edge 70 of the active door panel. The illustrated example of the top guide roller assembly 102 is adjustable with a cam 120, but one of ordinary skill in the art will appreciate that other mechanical structures may be similarly employed for adjusting the extension of the guide pin 112, including a configuration similar to the adjustment mechanism of the example lower guide roller assembly 104 discussed below. The illustrated example shows the guide pin 112 as a unitary structure from the top distal end 114 to the interior end 122. Alternatively, the guide pin 112 may be formed of two or more components providing the same function. The guide pin 112 is slidable within the housing 110, and may be constrained by a boss 124 from the housing disposed within a cavity 126 of the guide pin.

Figure 8:
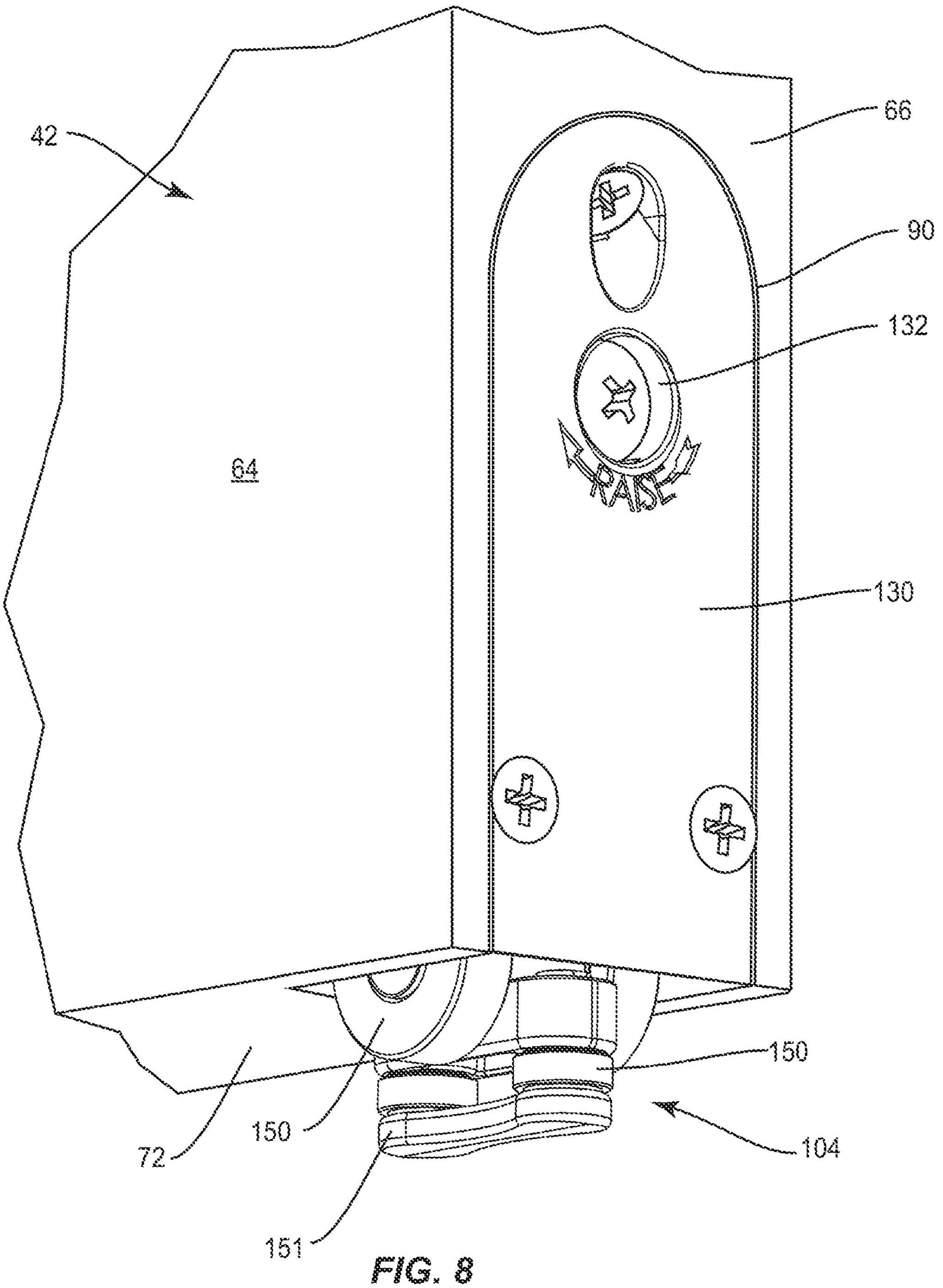
FIG. 8 is a detailed perspective view of a bottom corner of the active door panel of FIG. 5.
Figure 9:
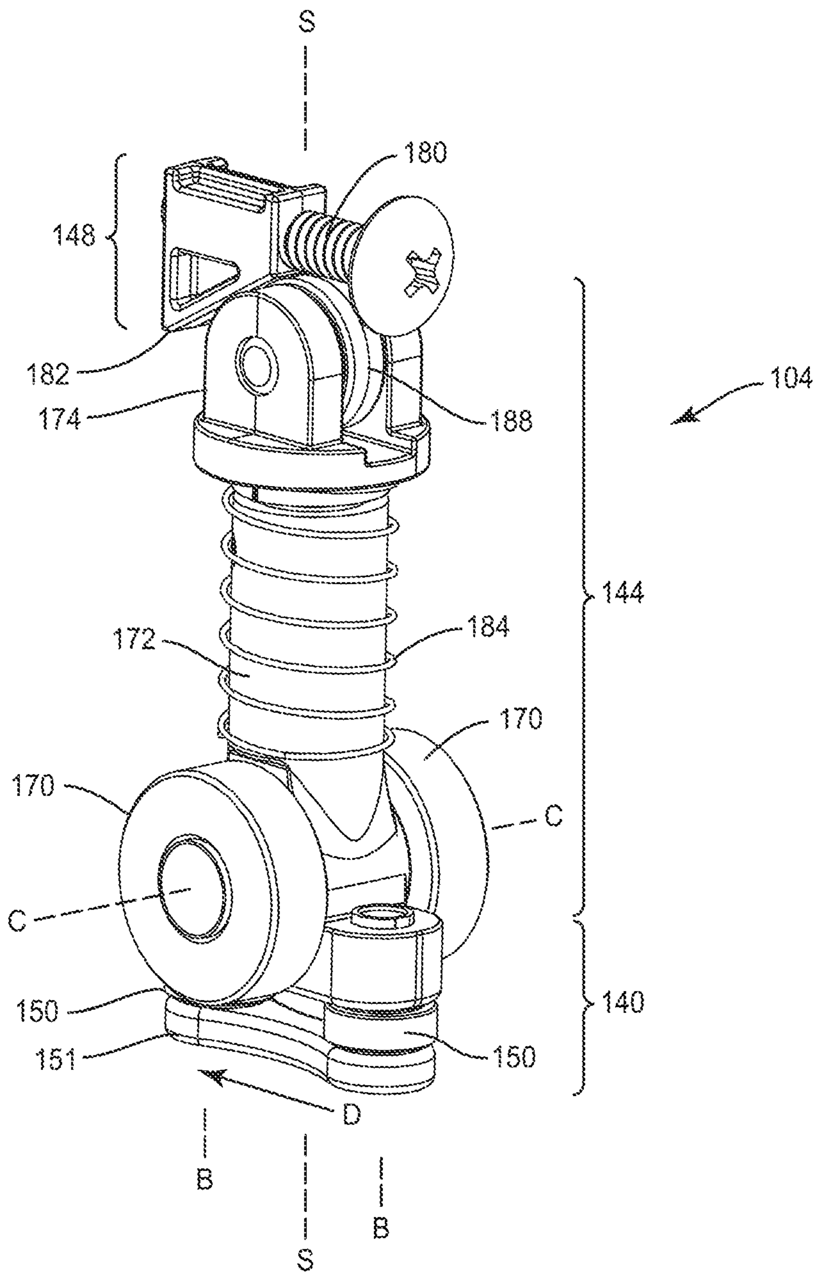
FIG. 9 is a detailed view of the inside of a bottom guide roller assembly.

FIGS. 8 and 9 show more detail of a bottom guide roller assembly 104 according to one embodiment. The bottom guide roller assemblies 104 may be configured to support the weight of the active door panel 42. Because the bottom guide roller assemblies 104 facilitate sliding of the active door panel 42 under the weight of the door panel, the bottom guide roller assemblies 104 may be distinct from the upper guide roller assemblies 102 (FIG. 6). Even still, the bottom guide roller assemblies 104 may include a bottom housing 130 disposed in a mortise groove 90 formed at the intersection of the outer edge 66 and the bottom edge 72 of the active door panel 42. The bottom housing 130 includes an opening 132 to access an adjustment mechanism along the outer edge 66 of the active door panel 42. While not shown, a door sweep, such as a kerfed door sweep, may be positioned on the bottom edge 72 of the active door panel 42. One of ordinary skill in the art will understand that door sweeps typically include resilient fins or bulbs intended for form a seal with a rigid surface, such as a top of the sill 34 (FIG. 4).

Further details of a bottom guide roller assembly are shown in FIG. 9. For clarity, the bottom housing 130 is omitted to further highlight the structure and function of this embodiment. The bottom guide roller assembly 104 includes a guide portion 140, a support portion 144, and an adjustment mechanism 148. The guide portion 140 is configured to retain the active door panel 42 in connection with the mounting frame 32 and facilitate maintaining motion along a pre-determined sliding path, defined by a respective guide slot 400 (FIG. 22), between the active door panel and the mounting frame. The guide portion 140 includes at least one roller bearing 150 for reducing friction between the guide portion 140 and a corresponding guide slot 400 (FIG. 23). In the illustrated embodiment, a pair of roller bearings 150 are provided, which are aligned along a travel direction D. Each roller bearing 150 is configured to rotate about a vertical axis B when in-use. A bridge 151 connects the pair of roller bearings 150 to add structural support and protection for the roller bearings. The bridge 151 is shaped to avoid interference between the bridge and the guide slot 400.

The support portion 144 of the bottom guide roller assembly 104 is configured to support the weight of the active door panel 42 and assist with sliding relative to the mounting frame 32. The support portion 144 may include a set of wheels 170 configured to rest on the sill 34 (FIG. 3) of the mounting frame 32 and roll along the sill as the active door panel 42 slides relative to the mounting frame. The wheels 170 may be configured to rotate about a horizontal axis C that is perpendicular to the vertical axis B and the direction of travel D. The support portion 144 may also be configured to swivel about a swivel axis S so that the direction of travel D is able to adjust and remain tangential with a respective guide slot 400 (FIG. 22) along the sill 34. To facilitate the ability to swivel, the wheels 170 of the support portion 144 may be mounted to a post 172 that is rotationally attached to a clevis 174.

The bottom guide roller assembly 104 may also be adjustable. An adjustment mechanism 148 may vary the distance between the bottom edge 72 (FIG. 8) of the active door panel 42 and the sill 34, by controlling the position of the wheels 170 relative to the bottom edge 72. In one embodiment, the adjustment mechanism 148 may include a screw 180 and a wedge 182. The screw 180 may pass into the housing 130 and into a threaded connection with the wedge 182. The interior dimensions of the housing 130 (FIG. 8) constrain the motion of the wedge 182 such that rotational motion of the screw 180 translates to linear motion of the wedge within the housing. A portion of the wedge 182, e.g. the hypotenuse, is configured to abut the support portion 144. The tapered shape of the wedge 182 allows linear translation of the wedge to create variable displacement of the support portion 144 along the swivel axis S. In one embodiment, a coil spring 184 may bias the support portion 144 toward a retracted position relative to the bottom edge 72 of the active door panel 42. The coil spring 184 may act between a lower flange of the clevis 174 and a shoulder (not shown) formed within the housing 130. The force provided by the wedge 182 on the support portion 144 can then act with gravity to extend the wheels 170 to be at least partially exposed below the bottom edge 72 of the active door panel 42 as shown in FIG. 8. In the illustrated embodiment, a further roller bearing 188 is provided on the clevis 174 to minimize friction between the wedge 182 and the support portion 144 and assist the adjustability and mechanical advantage of the wedge.

The illustrated embodiments of FIGS. 6 and 7 show the top guide roller assemblies 102 as distinct from the bottom guide roller assemblies 104 of FIGS. 8 and 9. In some other embodiments, each of the guide roller assemblies 100 may be substantially identical or designed as mirror images of one another. In one example, the top guide roller assemblies may have wheels similar to the bottom guide rollers. In some embodiments, each of the guide roller assemblies 100 may adjust via a cam, and in other embodiments, each guide roller assembly may adjust by a wedge.

Returning to FIG. 5, further features of the active door panel 42 are described below. For use in a sliding door unit 30 (FIG. 3), a latch 200 suitable for preventing motion of the active door panel 42 along a direction parallel with the face 46 may be included. If the active door panel 42 has at least one of a latch bore 80 and a deadbolt bore 82, and/or their associated apertures 84, the latch 200 may be configured to fit within one of the apertures. The latch 200 and related elements will now be discussed in association with FIGS. 10-12.

Figure 10:
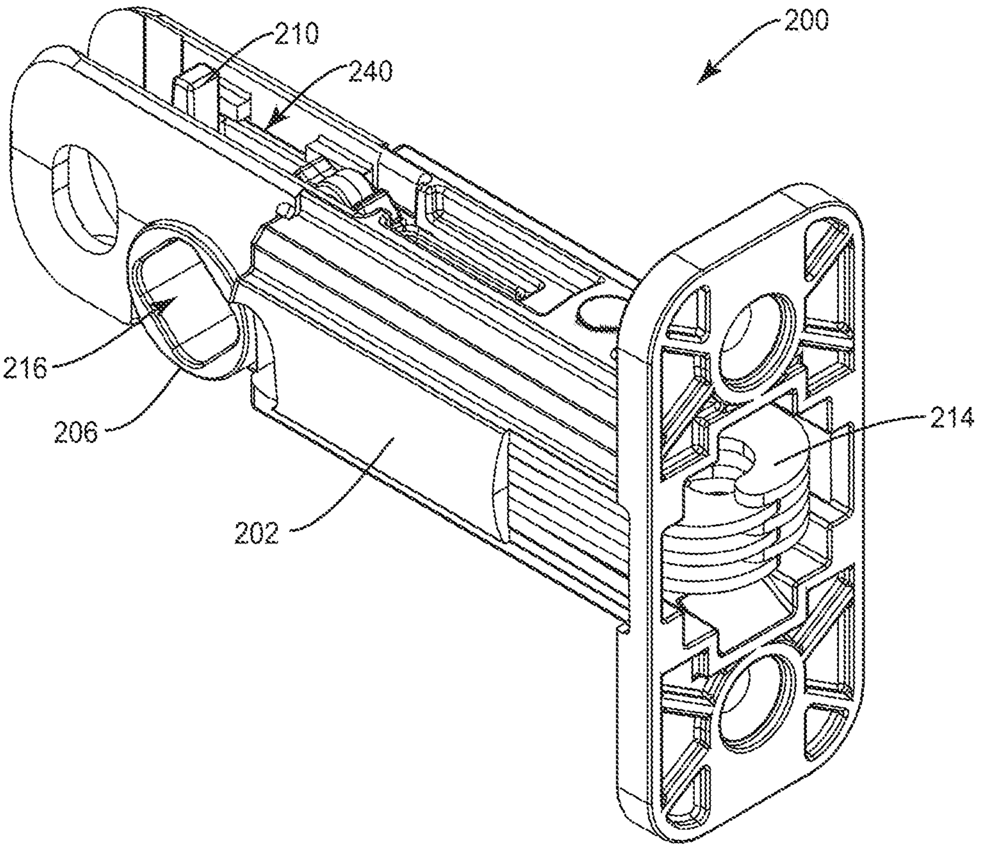
FIG. 10 is a perspective view of a latch for the active door panel according to a first embodiment in a latched position.

Turning first to FIG. 10, a suitable latch 200 may include a case 202 configured to fit within a standard, substantially cylindrical aperture, e.g., apertures 84, that extends from the outer edge 66 of the active door panel 42 into communication with either the latch bore 80 or the deadbolt bore 82 (see FIG. 5).

Figure 2:
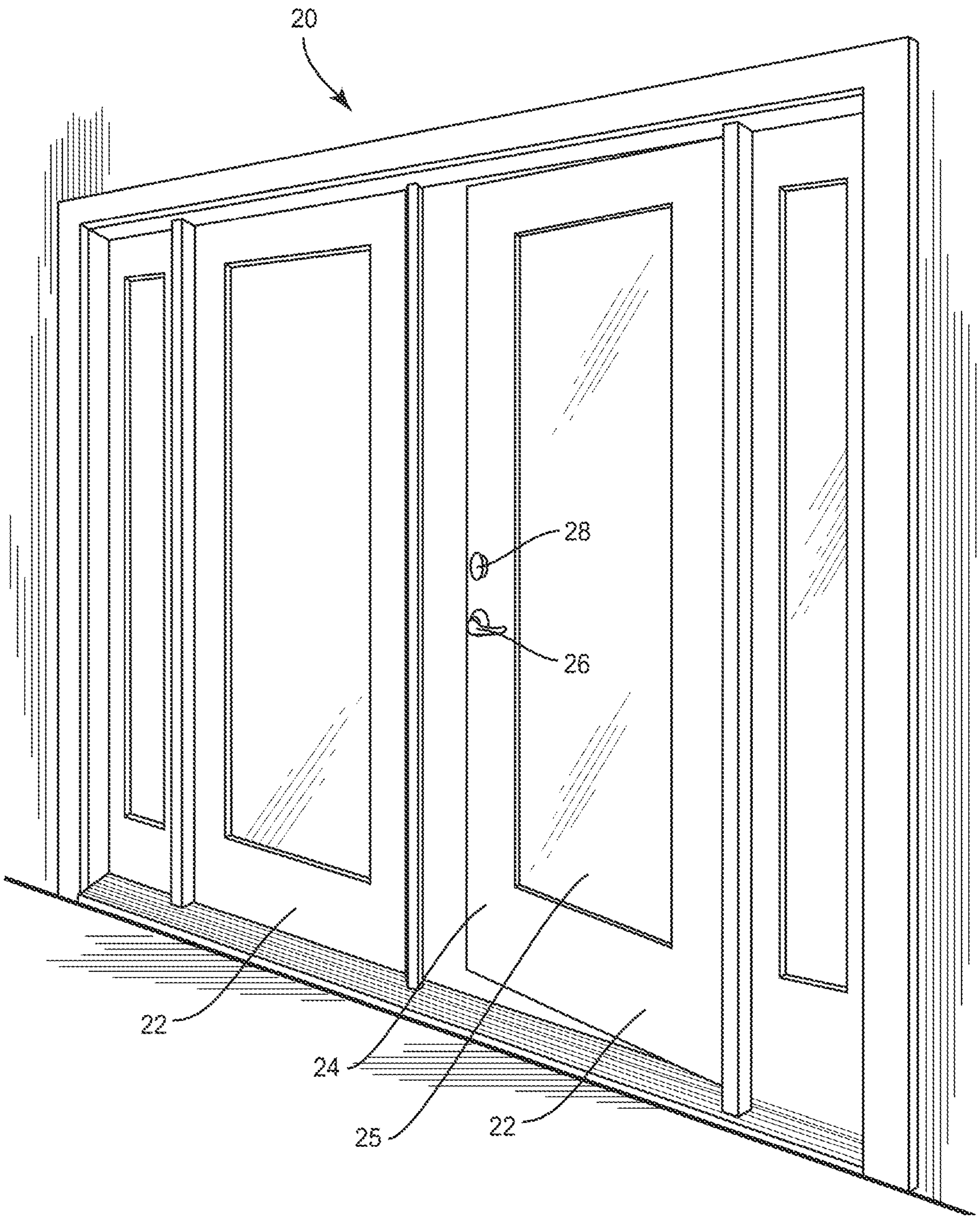
FIG. 2 PRIOR ART
FIG. 2 is a hinged door assembly consistent with the prior art.

With reference to FIGS. 10-13, the latch 200 may include a hub 206, a drive bar 210, and one or more pairs of pawls 214. The hub 206 includes a central lumen 216 configured to receive a shaft from corresponding operating hardware, e.g. a thumb-turn or key cylinder 28, FIG. 2, mounted to the active door panel. To accept a variety of operating hardware, the hub 206 may be configured to accept one or more adaptors (not shown) configured to alter the size or shape of the central lumen 216 to correspond with spindles of various operating hardware. The hub 206 may be configured to rotate, such as ninety degrees, to transition the latch from the open position shown in FIG. 13 to a closed position shown in FIG. 12, and vice versa. The hub 206 is shown with a drive arm 220 extending therefrom. The exterior periphery of the hub 206 may have a keyed shape, such as two flattened portions 224 with a rounded corner 228 therebetween. A leaf spring 230 is provided to engage with the flattened portion 224 in the respective open and closed positions of the latch 200. In this manner, the interaction between the hub 206 and the leaf spring 230 will tend to help the latch 200 maintain its orientation in either the open or closed position and help limit the likelihood that the hub 206 will rest in an intermediate position.

Rotation of the hub 206 is configured to result in translation of the drive bar 210 as the drive arm 220 applies a force to translate the drive bar relative to the case 202. The drive bar 210 is illustrated with a channel 240 that receives the drive arm 220. The channel 240 is sized to control the magnitude of translation of the drive bar 210 created by a ninety degree rotation of the hub 206. The drive bar 210 also includes an actuator pin 244 (FIG. 11) which is engaged with an actuation slot 250 (FIG. 14 of each pawl 214 of the one or more pairs of pawls.

Figure 11:
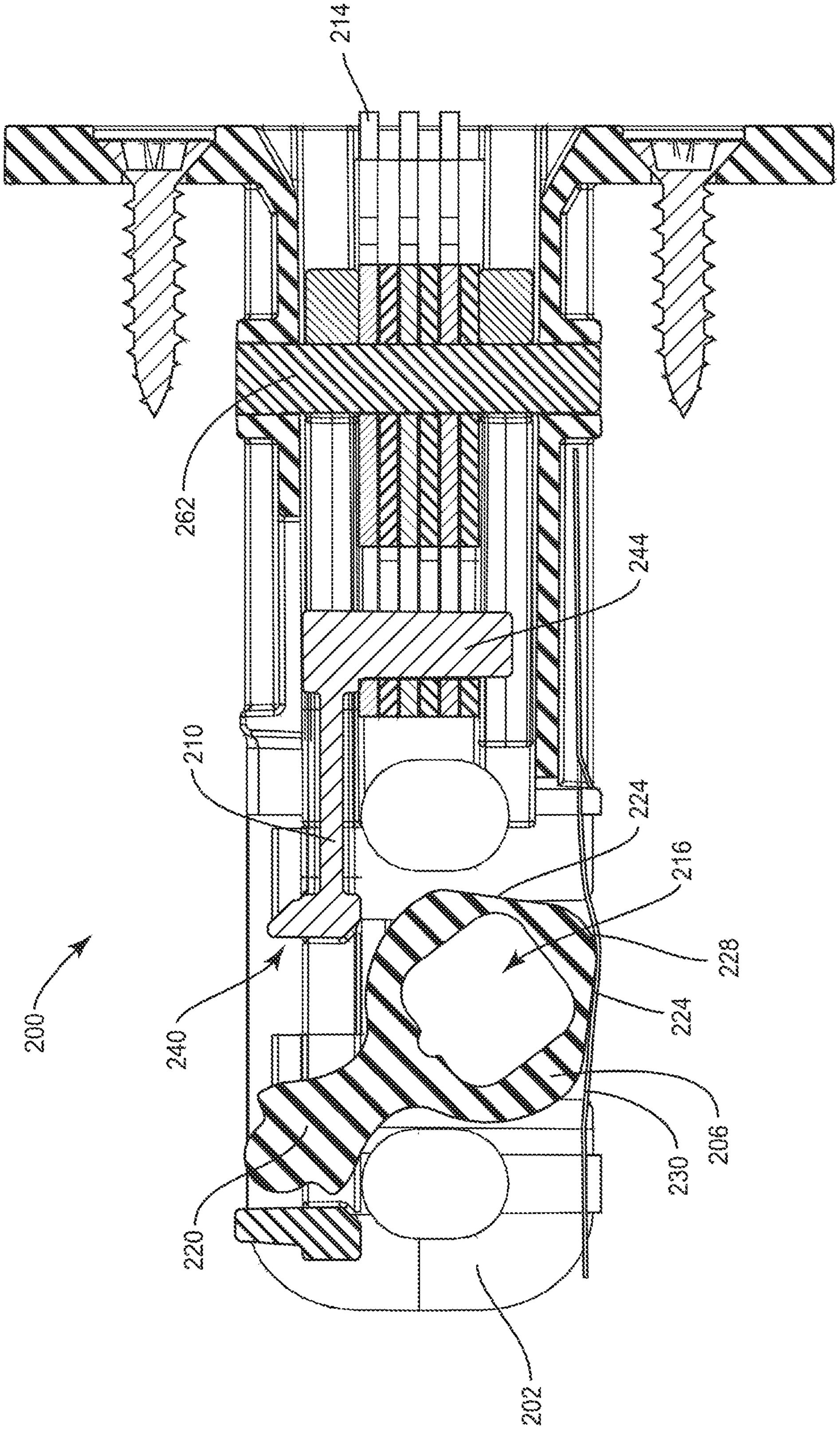
FIG. 11 is a cross section view of the latch of FIG. 10 is an open position.
Figure 12:
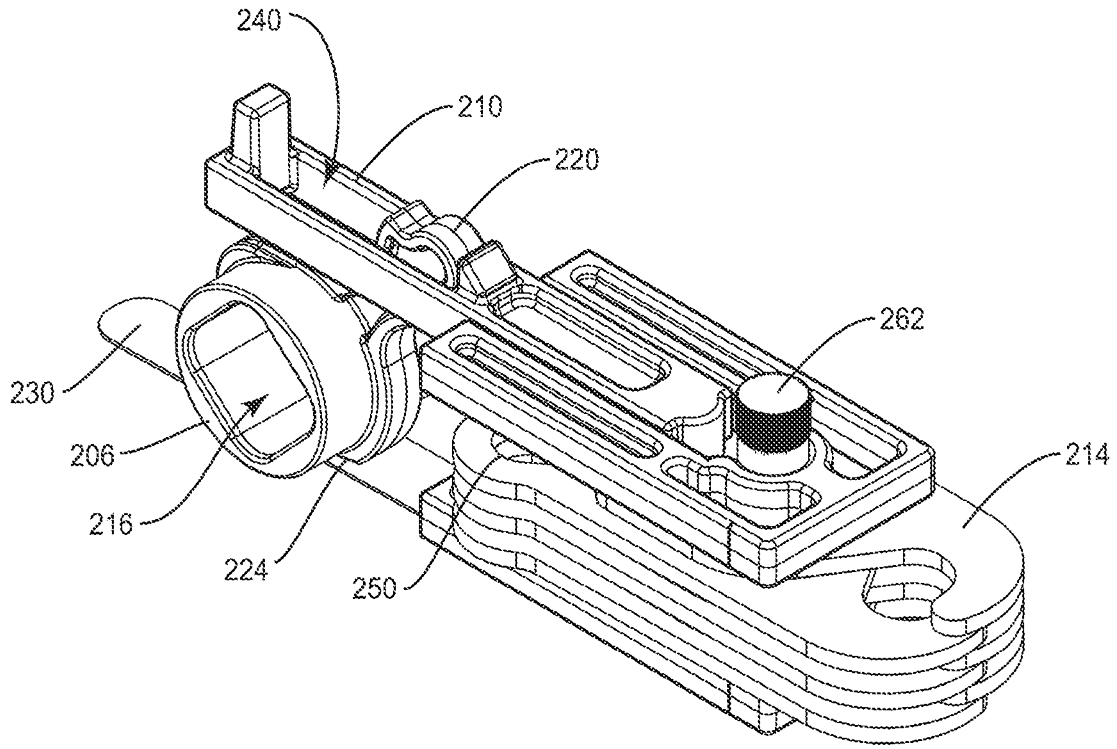
FIG. 12 is a perspective view of the latch of FIG. 10 with the housing omitted.
Figure 13:
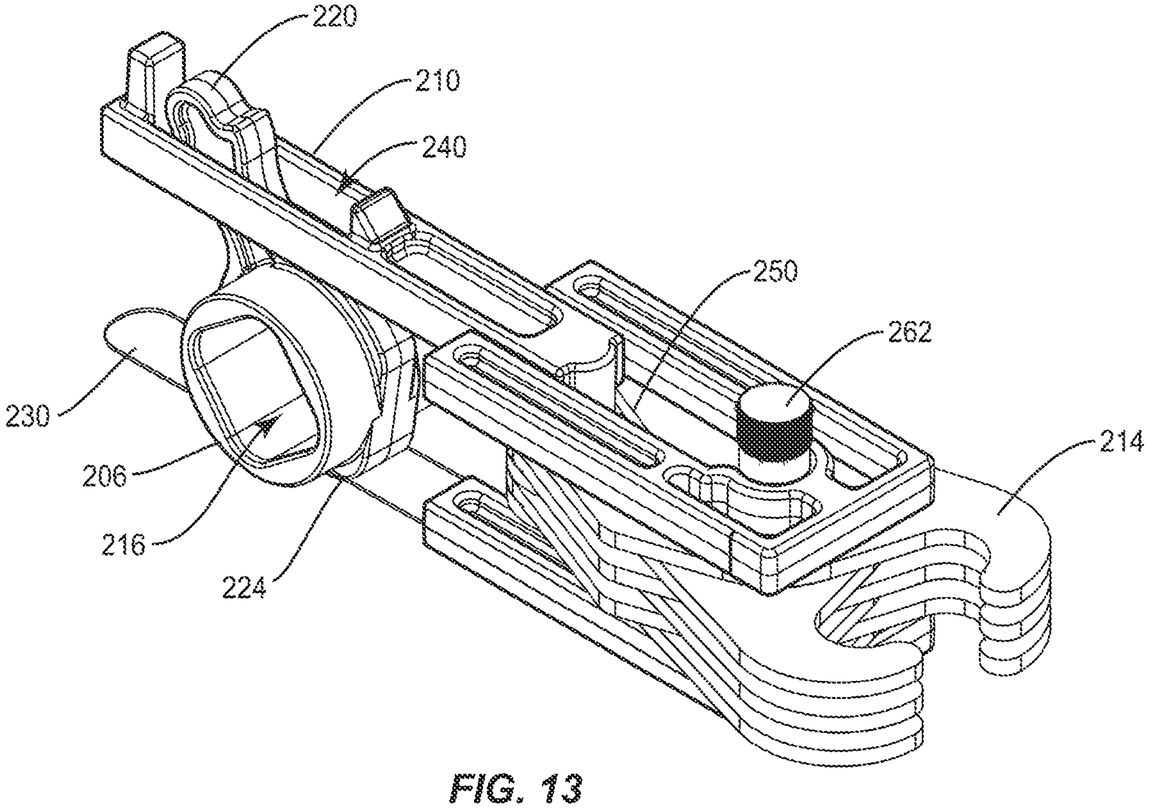
FIG. 13 is a perspective view of the latch of FIG. 12 in an open position.
Figure 14:
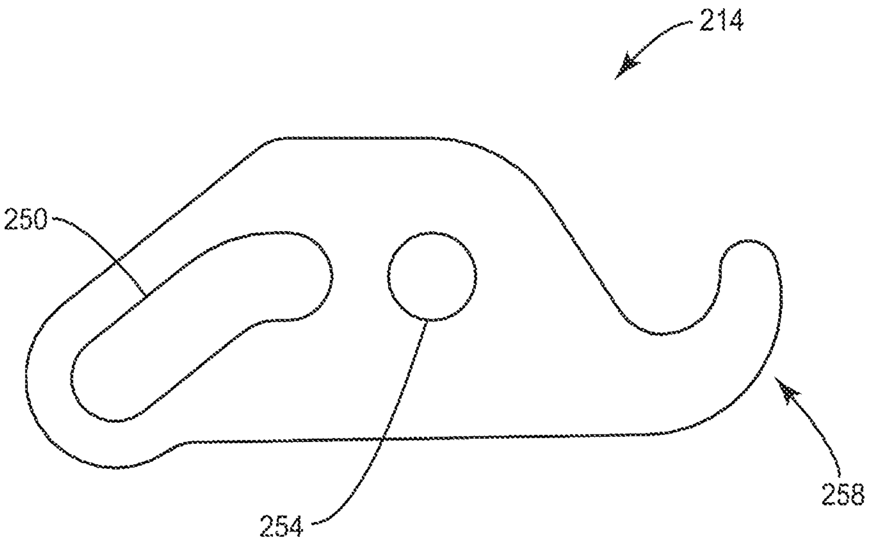
FIG. 14 is a detailed view of a pawl of the latch of FIG. 10.

As possibly best shown in FIG. 14, each pawl 214 may include the actuator slot 250, a mounting hole 254, and a gripper portion 258. The mounting hole 254 receives an axle 262 (FIG. 11). The axle 262 mounts the pawl 214 to the case 202 and provides a pin about which the pawl 214 is able to rotate between the open and closed position of the latch 200. The actuator slot 250 is configured to receive the actuator pin 244 of the drive bar 210. The actuator pin 244 moves along the actuator slot 250 as the drive bar 210 is translated by rotation of the hub 206. The actuator slot 250 is shaped such that movement of the actuator pin 244 along the actuator slot 250 is configured to cause the pawl 214 to rotate about the axle 262. By alternating the orientation of each pawl 214 of each pair of pawls relative to the case 202, rotation of each pawl about the axle 262 has the effect of rotating the gripper portion 258 of the pawls of the pair of pawls either toward one another to form the closed position or away from one another to form the open position.

When the active door panel 42 is closed, a portion of a keeper 300 (FIG. 18A) may be received between the separated gripper portion 258 of the pawls 214. The pawls 214 may then be driven to, and maintained in, the closed, pinched position by rotation of the hub 206 in a direction toward the active side jamb 40. As discussed above, rotation of the hub 206 may be facilitated with a thumb turn or a key cylinder. When in the latched position, rotation of the hub 206 in the opposite direction separates the pawls 214 once again so that the active door panel 42 may be disengaged from the keeper and slid relative to the mounting frame 32.

Figure 15:
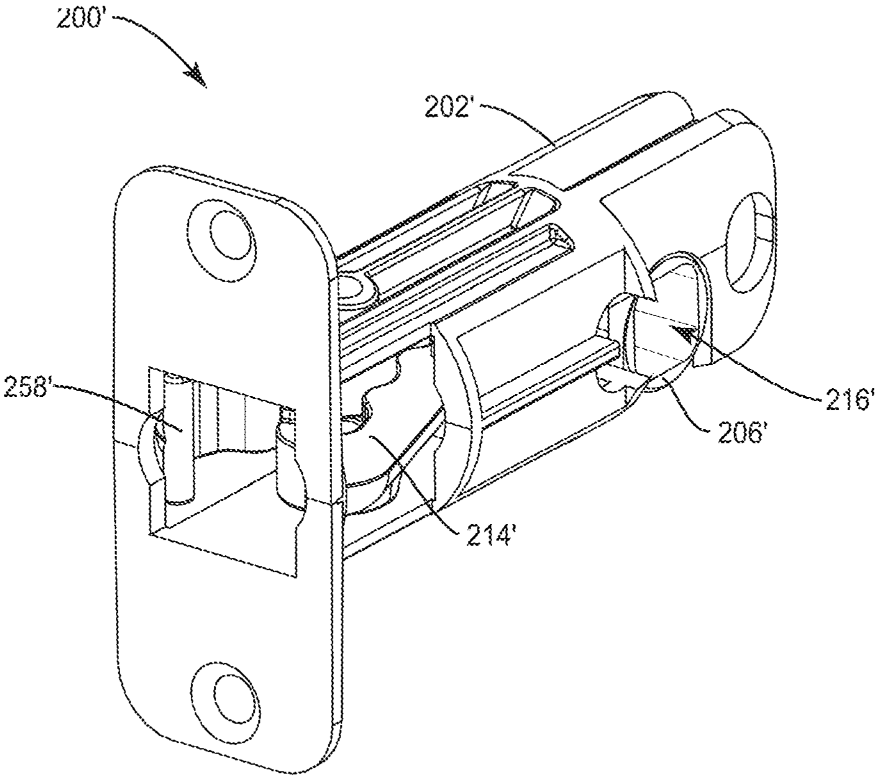
FIG. 15 is perspective view of a latch according to a second embodiment.
Figure 16:
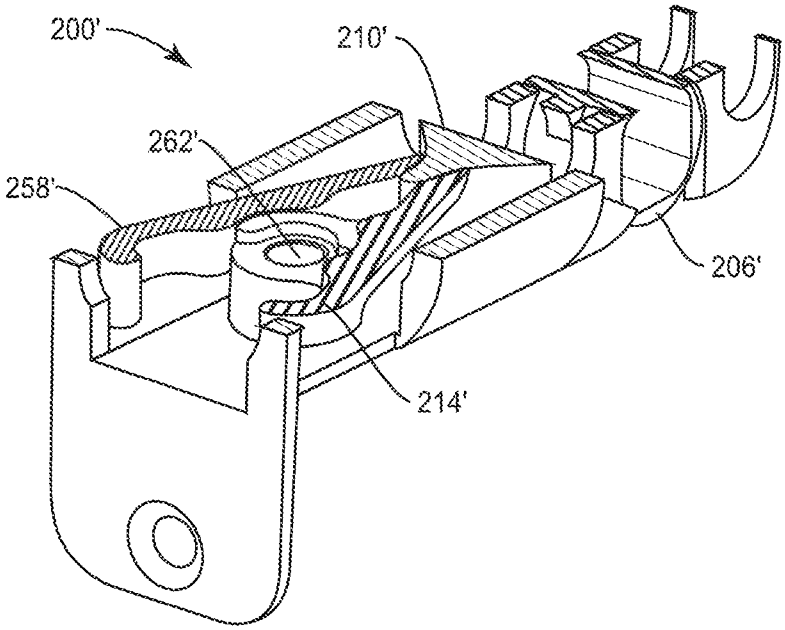
FIG. 16 is a cross sectional view of the latch of FIG. 15.

FIGS. 15 and 16, show an alternative latch 200'. In the alternative latch 200', the pair of opposing pawls 214' rotate about an axle 262' and are biased toward an open position by one or more biasing members, such as springs (not shown). Instead of reliance upon actuation slots in each pawl, the drive bar 210' acts like a wedge to separate the interior ends of the pawls 214' and drive the gripper portion 258' of each pawl 214' toward one another into a relatively closed position. The hub 206' and the central lumen 216' thereof may be substantially similar to the hub 206 described above. The hub 206' may have a keyed peripheral surface for interacting with a leaf spring (not shown) to bias the hub into either the open or closed positions. The drive bar 210' may be translated by the hub 206' in a manner substantially similar to the embodiment of FIGS. 10-14.

Each of the latches 200, 200' may be capable of operation through engagement with conventional thumb-turn hardware used to drive conventional cylindrical deadbolts. In addition, recent products have become available, such as the Kevo Convert from Kwikset, that retrofit an existing deadbolt and thumb-turn with a powered actuator that is able to perform the same rotational function as a thumb-turn, leading to locking or unlocking. As would be understood by one having ordinary skill in the art, the latches 200, 200' discussed herein are not limited to manual operation, but may be integrated into smart lock technology for powered and automated operation consistent with technology in existing products. In some embodiments, a power source (not shown), such as a rechargeable battery pack, may be incorporated into the case 202 or provided in an additional mortise groove formed in the outer edge 66 of the active door panel 42. In one embodiment, the power source may be replenished without accessing the power source, e.g. without replacing the batteries. In one example, the power source could be wirelessly recharged through Qi wireless charging technology where a charging "base" is built into the active side jamb 40.

Figure 17:
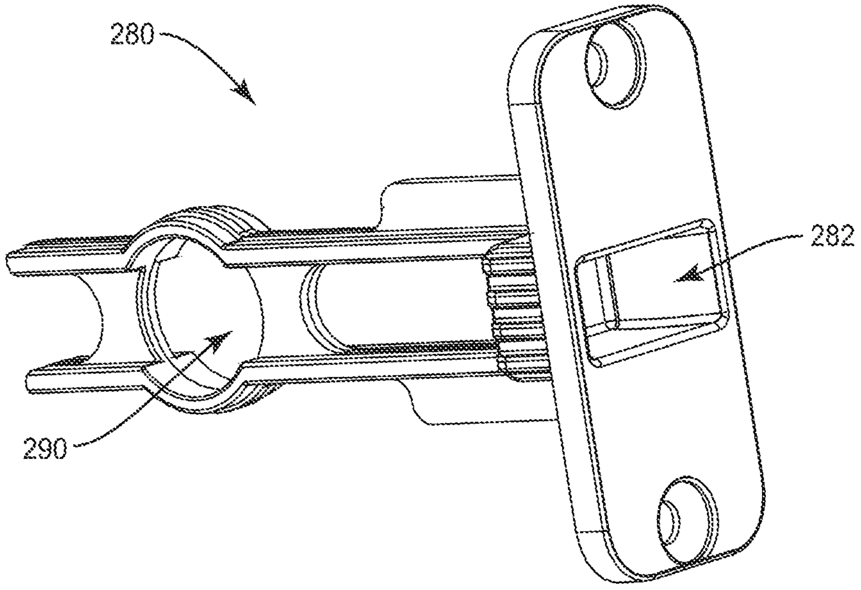
FIG. 17 is a perspective view an adaptor for an active door panel of a sliding door unit according to an embodiment of the present disclosure.

Turning to FIG. 17, an optional adaptor 280 is shown as an additional component of the active door panel 42 (FIG. 5). The adaptor 280 is configured to be positioned in one of the apertures 84 along the outer edge 66 of the active door panel 42 associated with either the latch bore 80 or the deadlock bore 82. The adaptor 280 includes a recess 282 configured to receive an alignment projection 286 (FIG. 18A) that is mounted to the active side jamb 40. As such, the adaptor 280 is configured to help control alignment of the outer edge 66 relative to the active side jamb 40 of the mounting frame 32 by providing a second point of contact between the outer edge and the active side jamb, the latch 200 (FIG. 10) providing the first point of contact. In the illustrated embodiment, the adaptor 280 is associated with the latch bore 80 and the latch 200 is associated with the deadbolt bore 82. The adaptor 280 is also designed to provide a passage 290 that is configured to be positioned in one of the bores 80, 82 of the active door panel 42 and arranged to permit clearance for hardware, such as the spindle of a knob 292 (FIG. 5).

In one embodiment, opening and closing of the latch 200, and sliding of the active door panel 42 relative to the mounting frame 32 may be facilitated with a handle set common to hinged entryway doors, including knobs 292, or handle levers, and thumb-turns 296 (FIG. 5). The use of a handle set compatible with hinged entryway doors further increases the availability of style options and combinations for the consumer compared to traditional sliding doors. A handle set is suitable for traditional use on a hinged door panel if the elements of the handle set can be mounted to the door panel at locations corresponding to the latch bore 80 and the deadbolt bore 82 while also being sized to hide the bores from view.

Figure 18A:
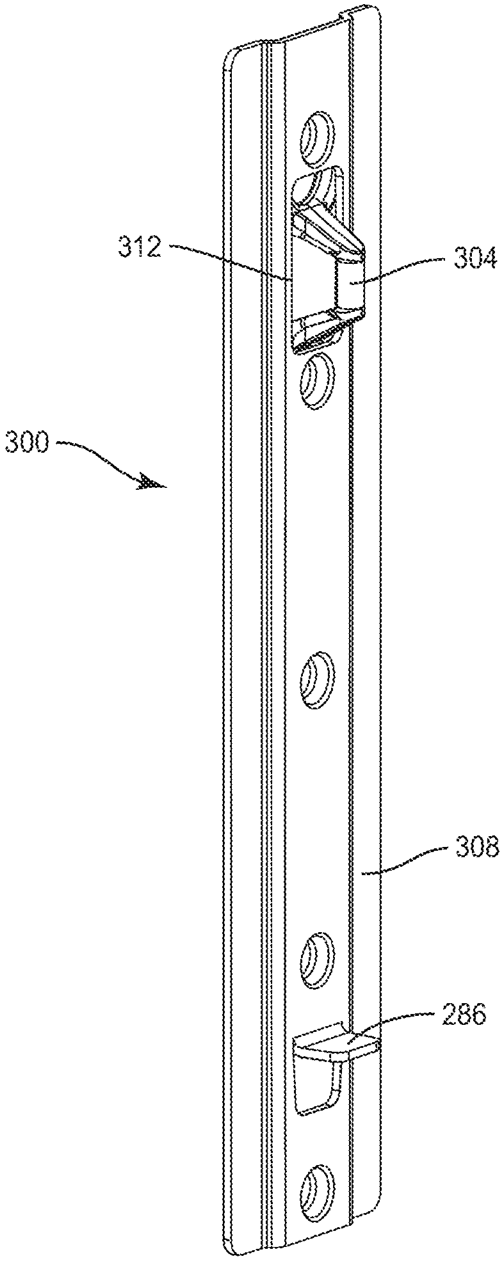
FIGS. 18A and 18B are front and back views of a keeper according to one embodiment for a sliding door unit according to the present disclosure.
Figure 18B:
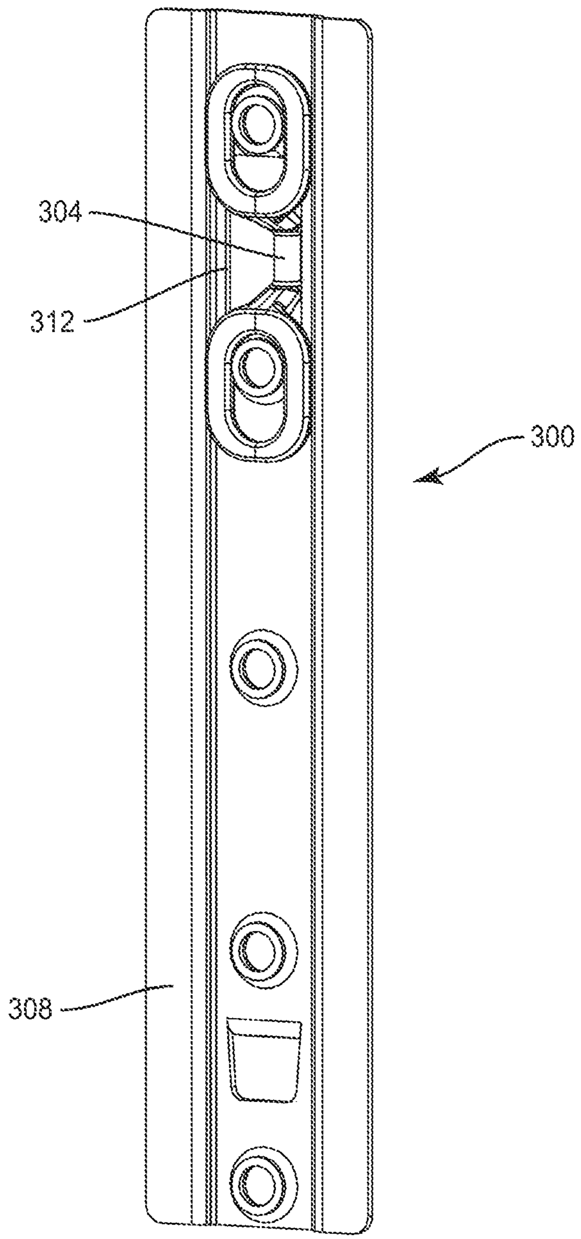

As discussed above, in operation, the latch 200, 200' is configured such that the gripper portions 258 of each pawl 214 closes around a portion of a keeper formed with or attached to the active side jamb 40. FIGS. 18A and 18B show the front and back of a keeper 300 suitable for mounting to the active side jamb 40 and interacting with the latch 200 and the adaptor 280 to align the outer edge 66 of the active door panel 42 with the active side jamb 40, and maintain the active door panel in the closed position.

The keeper 300 may include the projection 286 extending from an exposed side thereof. As referenced above, the projection 286 is configured to fit within the recess 282 of the adaptor 280 (FIG. 17) to assist alignment between the active door panel and the active side jamb. The keeper 300 may also include a keeper projection 304, which may extend from the keeper 300 in a direction away from the active side jamb 40. The keeper 300 of the illustrated embodiment has a two-piece construction. The alignment projection 286 is integral with a mounting plate 308 that can be attached to the active side jamb 40. The keeper projection 304 is formed as a second component that is configured to extend through an opening 312 in the mounting plate 308. The opening 312 is configured to be larger than the keeper projection 304 so that the position of the keeper projection 304 relative to the mounting plate 308 is adjustable. As a result, the distance between the keeper projection 304 and the alignment projection 286 may be produced with a built-in tolerance to correctly match up with the latch 200 and the adaptor 280 respectively.

Having described the active door panel 42 and its components, a sliding door unit 30 according to one embodiment will now be discussed in further detail. Referring back to FIGS. 3 and 4, the closed and open positions of the sliding door unit 30 are illustrated respectively.

Figure 19:
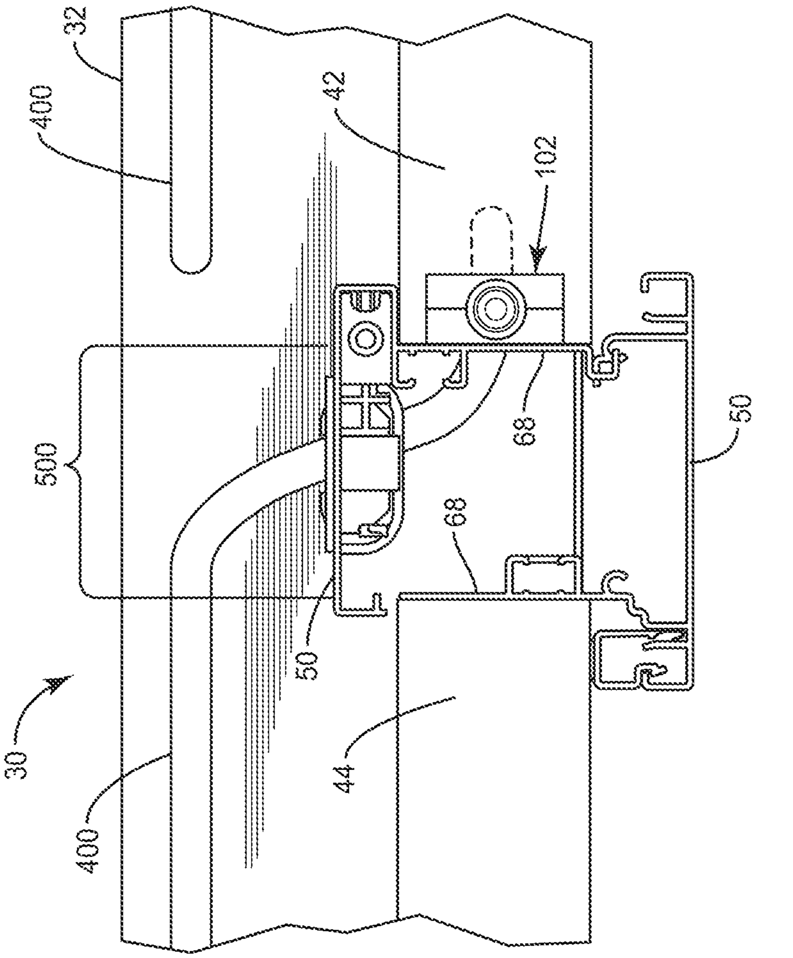
FIG. 19 is a detailed top view of the closed sliding door unit of FIG. 3 with the header omitted.

The closed position of the sliding door unit 30 is illustrated in further detail in FIG. 19. When the active door panel 42 is closed, the sliding door unit 30 positions the active door panel and the fixed door panel 44 such that the active door panel is substantially adjacent to, parallel to, and substantially coplanar with the fixed door panel.

Figure 20:
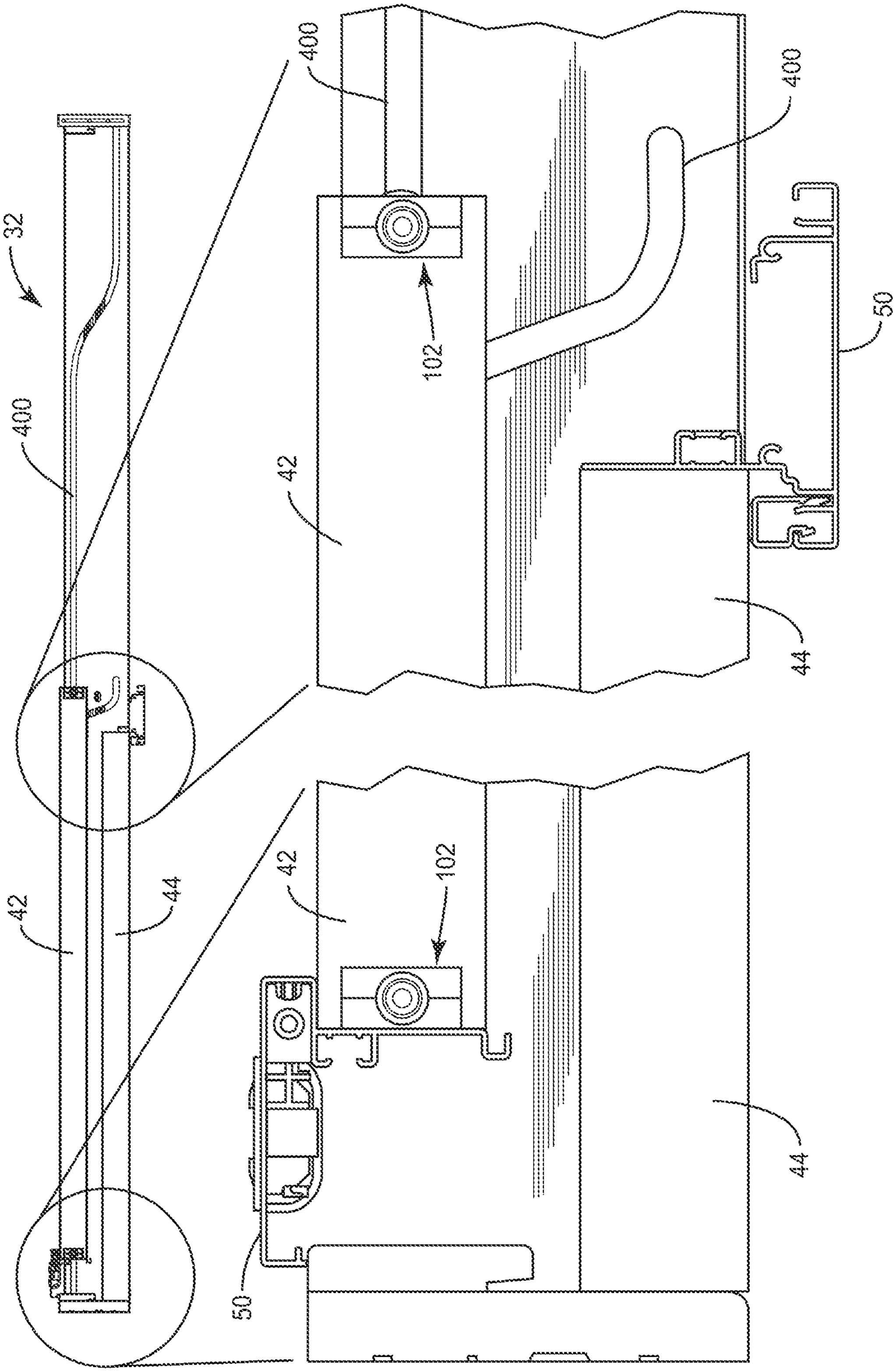
FIG. 20 is a top view of the open sliding door unit of FIG. 4 with the header omitted.

The open position of the active door panel 42 is shown in further detail in FIG. 20. In the open position, the active door panel 42 slides relative to the mounting frame 32 into a position where the active door panel is parallel to and overlapping with the fixed door panel 44 such that the active door panel and the fixed door panel are not coplanar.

Figure 21:
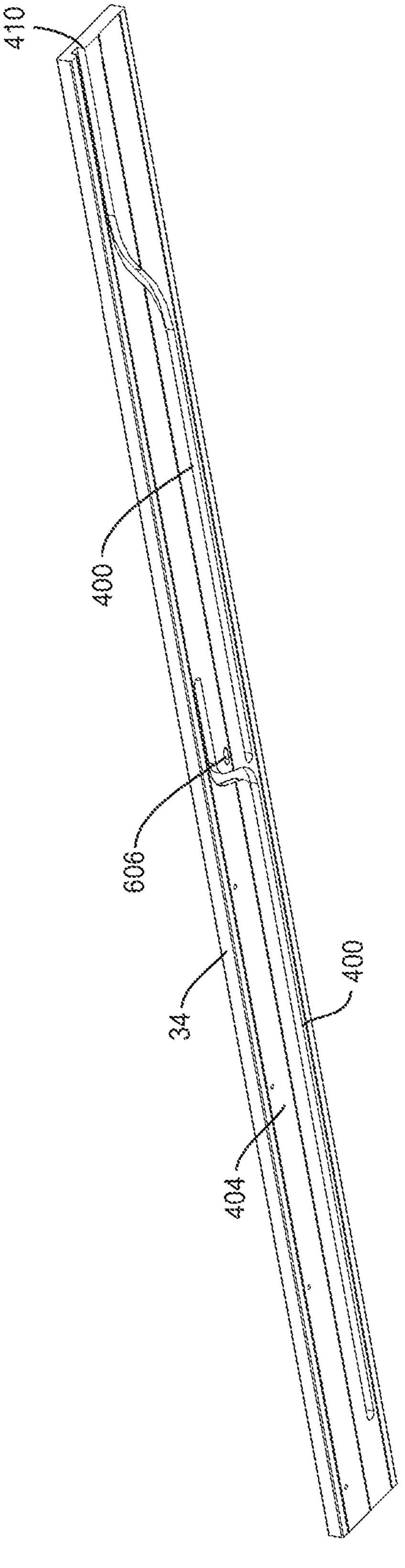
FIG. 21 is a detailed view of the header according to an embodiment of a sliding door unit according to the present disclosure.
Figure 22:
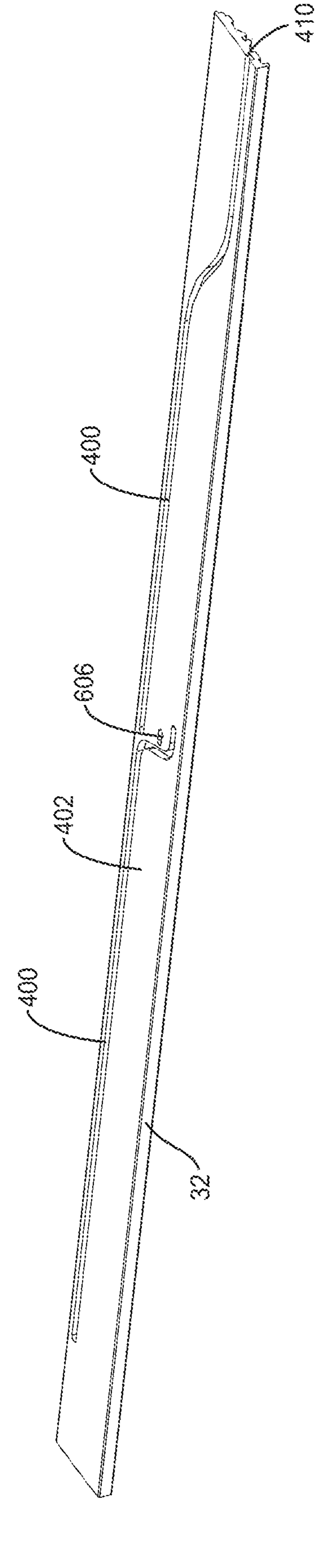
FIG. 22 is a detailed view of the sill according to an embodiment of a sliding door unit according to the present disclosure.
Figure 23:
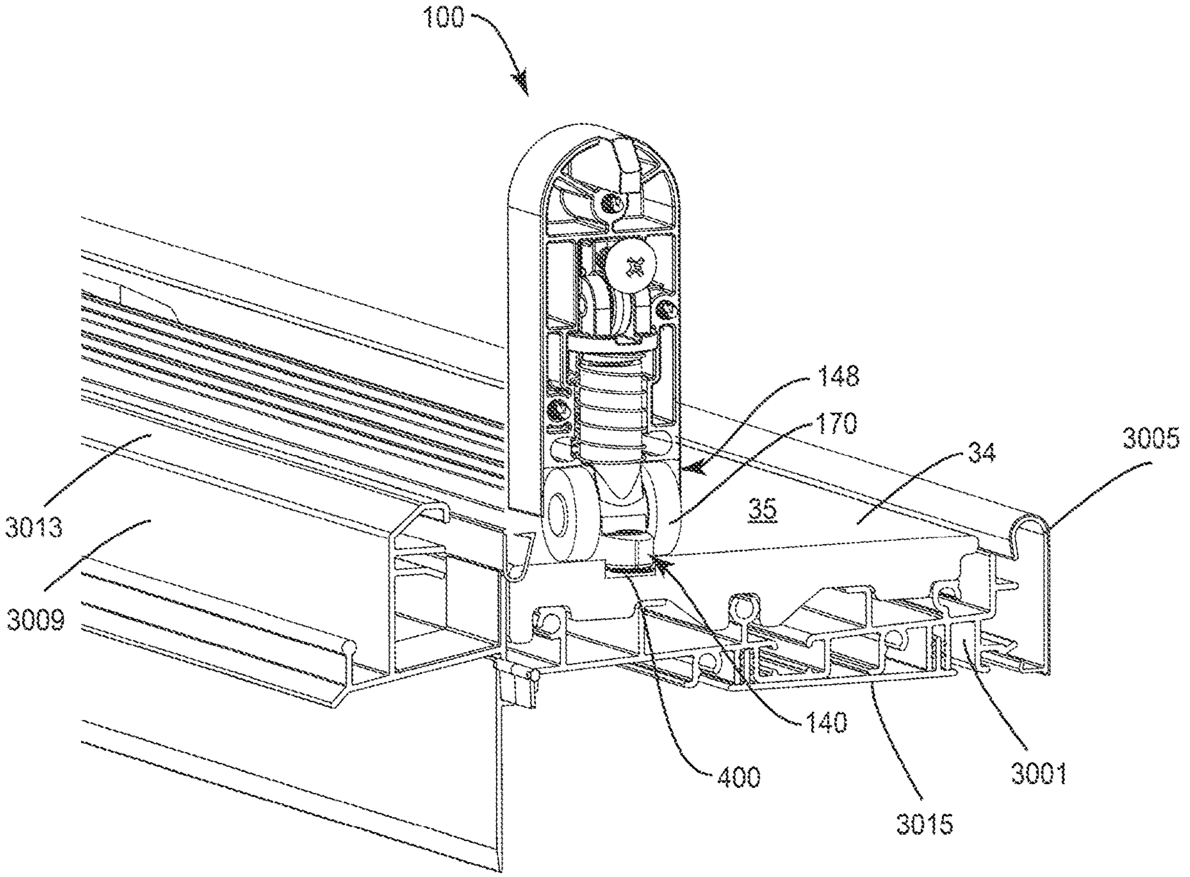
FIG. 23 is a detailed view of a bottom guide roller assembly engaged with a sill according to an embodiment of the present disclosure.

To facilitate motion between the closed position and the open position, the sill 34 and the header 36 of the mounting frame 32 may each include one or more guide slots 400 (FIGS. 21 and 22). The top surface 402 of the sill 32 and the bottom surface 404 of the header 34 are shown in FIGS. 22 and 21 respectively. The guide slots 400 may be non-linear and may be described as partially S-shaped. In the illustrated embodiment, the sill 32 and the header 34 each include a pair of guide slots 400. The two slots of the pair of guide slots 400 may be unique from one another as shown, or the two slots of each pair of guide slots may have the same shape. Both guide slots 400 of each pair are used by the active door panel 42 and correspond to respective guide roller assemblies 100 (FIG. 5). In one embodiment, the sill 32 and the header 34 may each comprise a single guide slot 400 that may receive a portion of more than one guide roller assembly 100.

In the illustrated embodiment, each guide slot 400 is shown as a square channel formed in the respective surfaces of the sill 32 and the header 34. The sidewalls 410 of each square channel may be configured to engage the respective roller bearings 116, 150 of the guide roller assemblies 100. In other embodiments, the guide slots 400 may pass completely through portions of the sill 32 or the header 34. In one example, a guide slot 400 that passes completely though the sill 32 may provide a water drainage benefit because water on the sill 32 that attempts to flow toward the interior of the sliding door unit 30 may fall through the guide slot 400. There, the water may be collected and desirably channeled by other sub-sill structures. In another embodiment, the depth of the guide slots 400, particularly the guide slot of the sill 32, may vary to create a sloped bottom surface of the square channel to influence any water collected by the guide slot 400 to flow in a direction toward the side jambs 38, 40. In certain embodiments, the guide slots 400 may be T-slots (not shown), which have a cross section that provides a narrow entrance and a wider channel.

To permit sliding between the open and closed positions described above, the guide slots 400 are non-linear. The shape of the guide slots 400 may be considered partially S-shaped. The shape of each guide slot 400 in each pair of illustrated guide slots may be different. Generally, the shape of the guide slots in the sill 34 will correspond with the shape of the guide slots in the header 36.

FIG. 23 shows a representative guide roller assembly 100, e.g. a bottom guide roller assembly 104, engaged with a representative guide slot 400, particularly a guide slot within the sill 34. As shown, the guide portion 144 of the bottom guide roller assembly 104 is positioned within the guide slot 400. The wheels 170 of the support portion 148 rest on and are configured to roll along the top surface 402 of the sill 34. One having ordinary skill in the art will understand that the term "sliding" (or slide) is used in the present disclosure to distinguish from a door panel that rotates using one or more hinges that create a fixed vertical pivot axis relative to a door frame. The term "sliding" is otherwise broadly used herein to include sliding, rolling, and even pivoting about axes which are capable of moving relative to the mounting frame 32.

Figure 1:
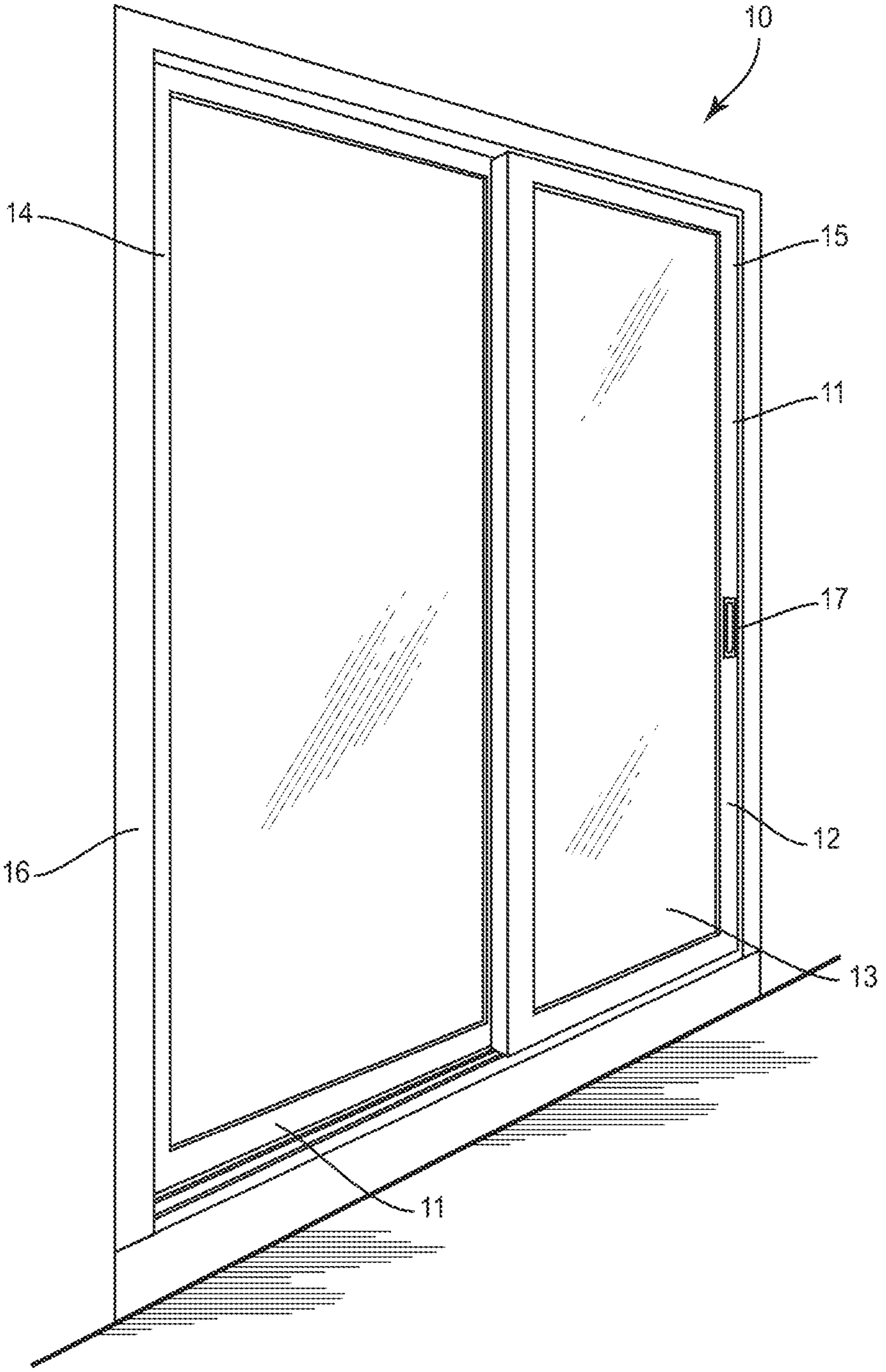
FIG. 1 PRIOR ART
FIG. 1 is a sliding door assembly consistent with the prior art.

In certain embodiments, the sliding door unit 30 may provide the relative open and closed positions discussed above and shown in FIGS. 19 and 20 with or without including door panels that are suitable for use as hinged door panels. Further, embodiments of the present disclosure contemplate inclusion of one or more door panels suitable for use as hinged door panels that are offset in the closed position as well as the open position, and slide linearly relative to one another, similar to the arrangement within the conventional sliding door unit 10 illustrated in FIG. 1.

Returning to FIG. 19, when the active door panel 42 and the fixed door panel 44 produce a substantially co-planar closed position for the sliding door unit 30, the positioning of the adjacent edges of the closed door panels may result in a gap or margin 500 between those adjacent edges. To close the gap and resist unwanted infiltration of air or water, an astragal 50 may be attached to the corresponding inner edge 68 of each door panel 42, 44. The astragal 50 of each door panel may be configured to engage with one another when the door panels are closed. The astragals 50 may separate from one another as the active door panel 42 is opened. While not shown, each astragal 50 may include one or more weather-strip, resilient fin, gasket or other compliant structure capable of forming a seal with each other, or in contact with a rigid surface, such as the other astragal or a portion of the door panel 42, 44, when the door panels are in the closed position. The astragals 50 may also provide structural strength to the closed sliding door assembly 30.

Figure 24:
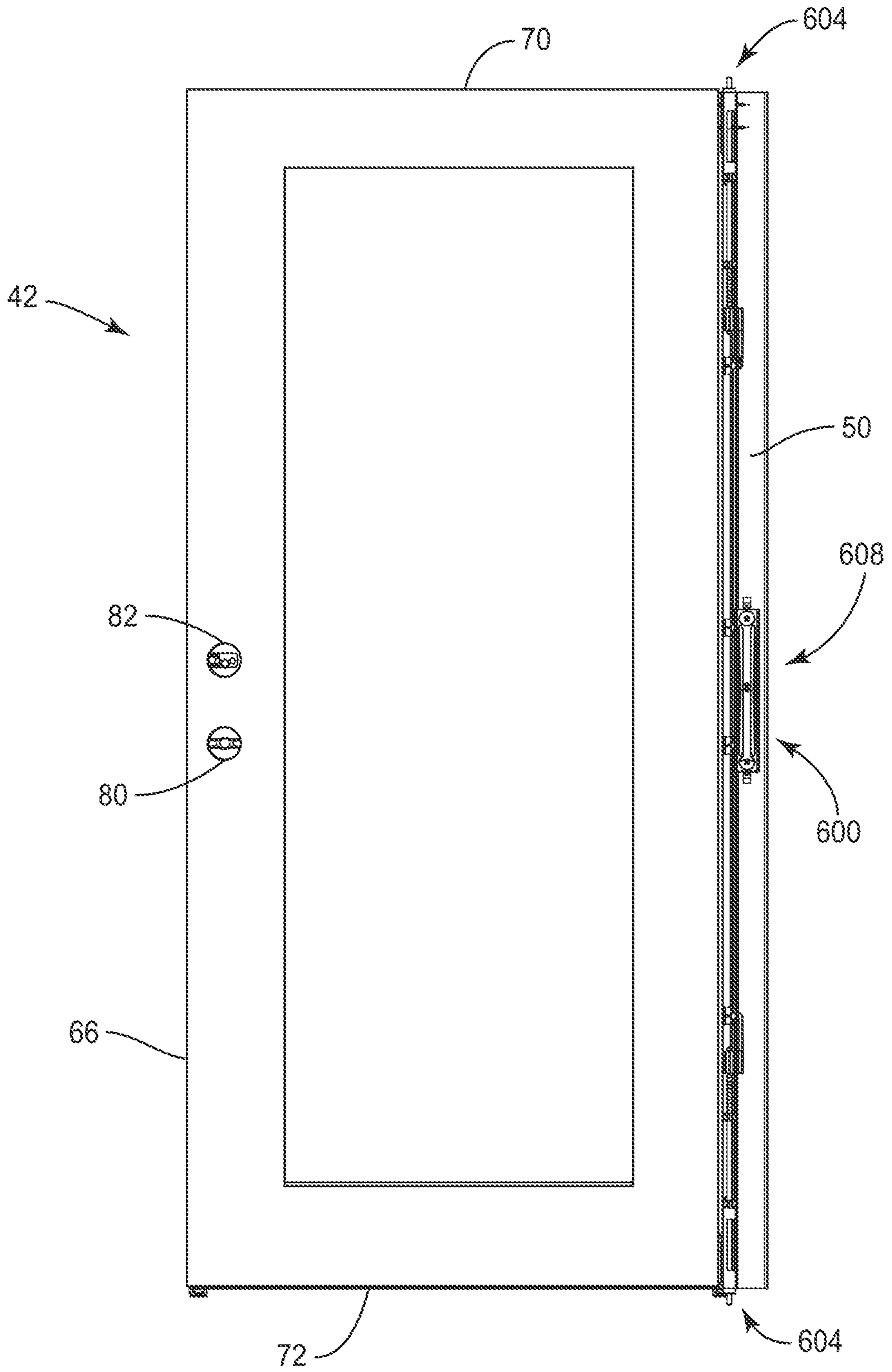
FIG. 24 is an interior side view of an active door panel according to another embodiment of the present disclosure.

More detail of optional features of the astragals 50 now will be discussed. Turning to FIG. 24, the astragal 50 of the active door panel 42 may be designed with a supplemental lock 600 as a redundant system to the latch 200 (FIG. 10) for securing the active door panel in the closed position. The supplemental lock 600 may be housed within the astragal 50 of the active door panel 42 and configured to slide therewith. The supplemental lock 600 may include at least one shoot bolt 604 and an actuator 608. The shoot bolt 604 may include an upper shoot bolt capable of being extended into engagement with the header 36 and/or a lower shoot bolt capable of being extended into engagement with the sill 34 at pin captures 606 (FIGS. 21 and 22). An actuator 608 is configured to extend and retract the shoot bolts 604, either simultaneously or individually. For example, an actuator may be provided for each of the shoot bolts individually. In the illustrated embodiment, the actuator 608 is a flip-lever actuator that is capable of simultaneously extending the upper and lower shoot bolts from the top and bottom ends of the astragal 50.

Astragals with shoot bolts and actuators have been attached to the free edge of the passive hinged door of French Door entryway systems with the goal of holding the passive door closed. Examples of such astragals are found in U.S. Pat. Nos. 7,735,882 and 8,157,299, each of which is owned by the original owner of the present disclosure. Linkage connections between the shoot bolts and the actuator discussed in the example patents may be applicable to operating the shoot bolts 604 of the present supplemental lock 600. The supplemental lock 600 of the present disclosure, however, applied to the active door panel 42, and is configured to secure the door panel at a location remote from the edge having the latch, i.e. along the vertical edge of the door panel opposite the latch bore 80 and the deadbolt bore 82.

Figure 25:
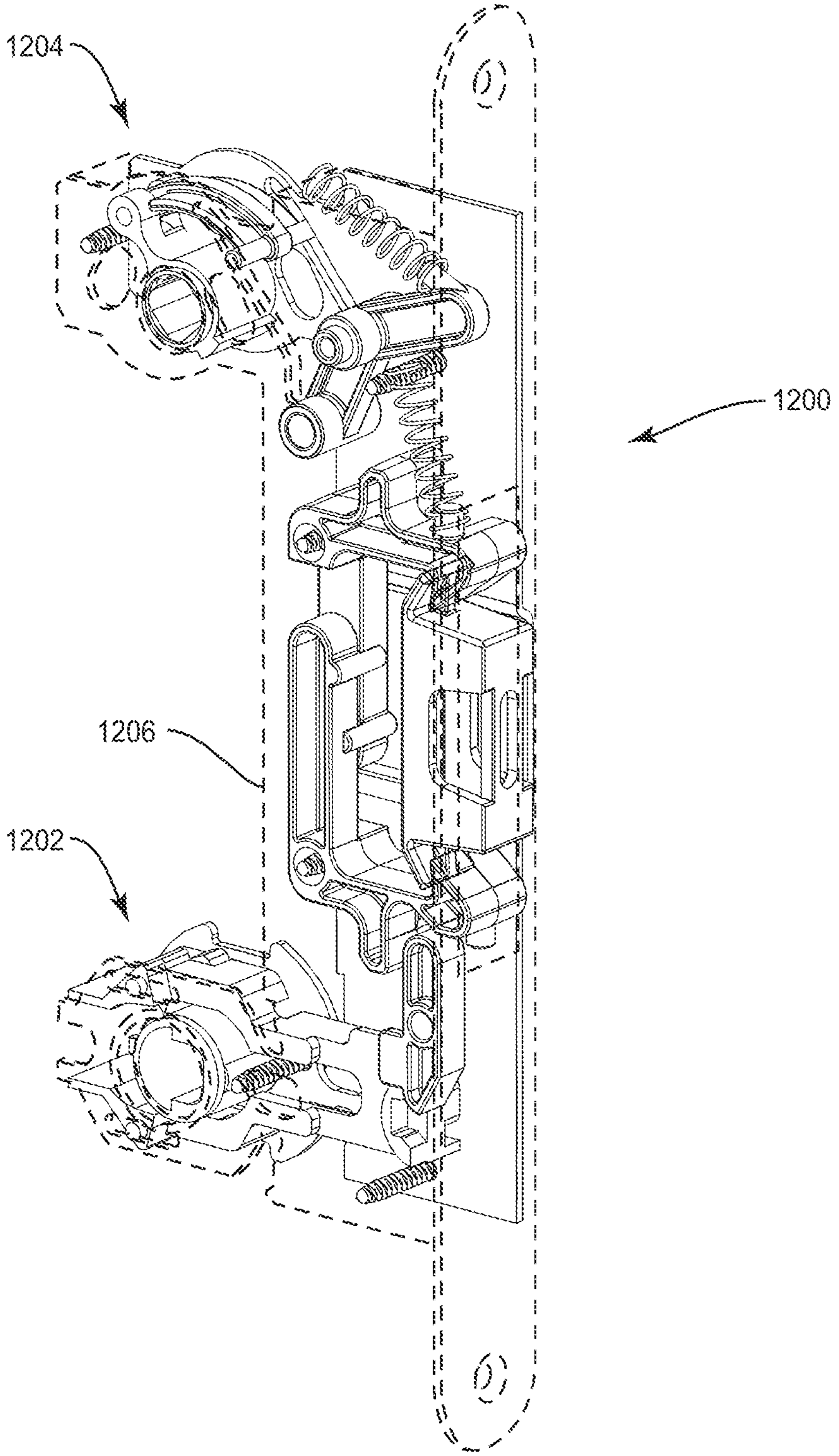
FIG. 25 is a perspective view of a latch according to a third embodiment of the present disclosure.
Figure 26:
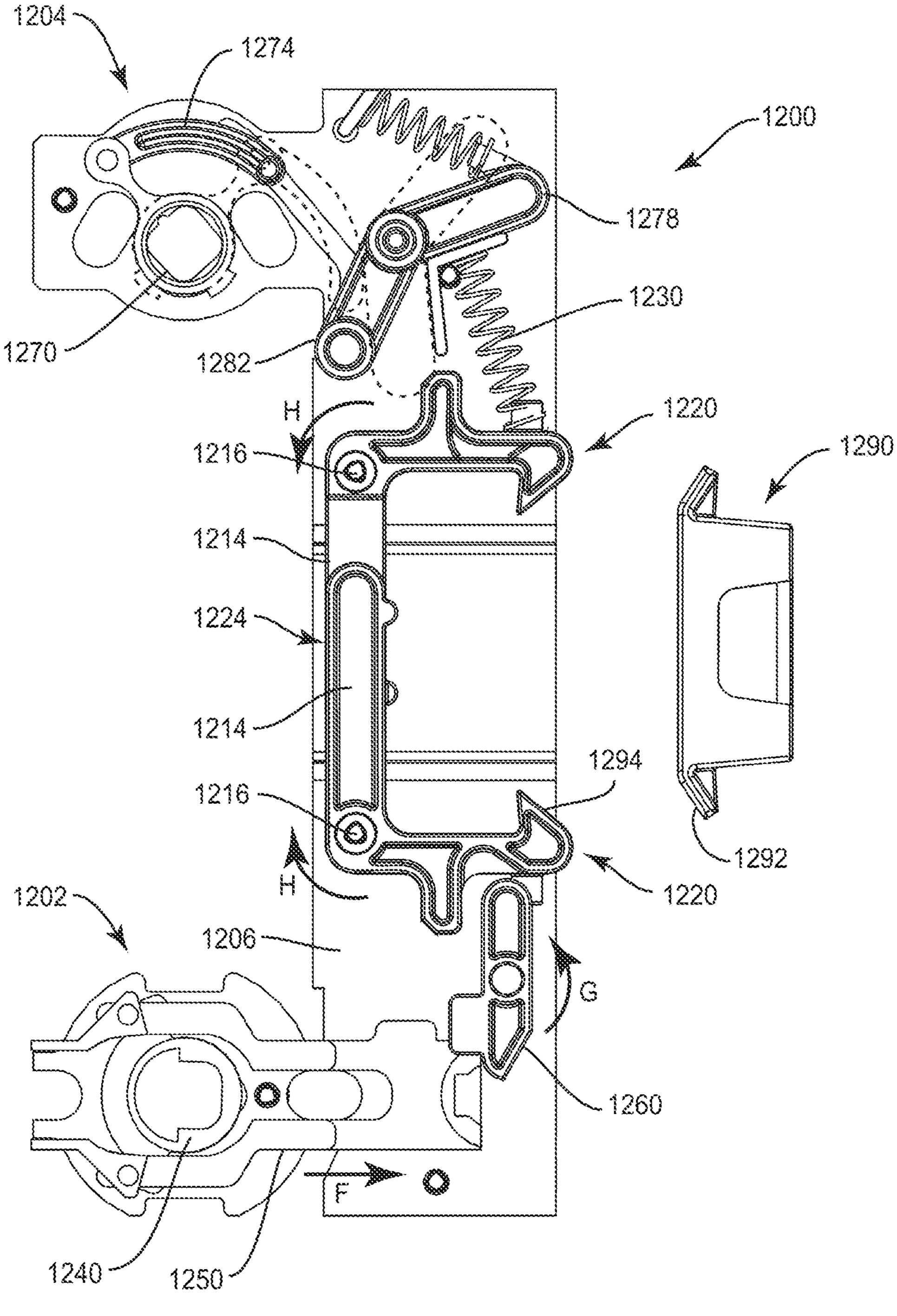
FIG. 26 is a side view of the latch of FIG. 24 with the mortise box omitted.

Turning to FIGS. 25 and 26, a mortise lock 1200 is illustrated as an alternative to the latches 200, 200' that are discussed above. The mortise lock 1200 includes a latch drive 1202 operable with the pair of handles (e.g. knobs 292, FIG. 5) and a deadbolt drive 1204 operable with a thumb turn or a key cylinder. The latch drive 1202 and the deadbolt drive 1204 are each housed in a mortise box 1206. A mortise groove 90 may be formed in the outer edge 66 of the active door panel 42 between the apertures 84 for accommodating the mortise box 1206 and allowing the latch drive 1202 and the deadbolt drive 1204 to align with the latch bore 80 and the deadbolt bore 82 respectively.

FIG. 26 shows the mortise lock 1200 with the mortise box substantially omitted to illustrate the operation of the mortise lock in greater detail. The mortise lock 1200 includes a pair of pawls 1214. In the illustrated embodiment, each of the pawls 1214 is L-shaped and pivotably mounted to the mortise box 1206 at pivot points 1216. One leg of the L-shaped pawls 1214 may provide a grasping portion 1220 and the other leg of the L-shaped pawls 1214 may provide an engagement portion 1224. The engagement portion 1224 of each pawl 1214 is configured such that the motion of one pawl 1214 generates a corresponding movement of the other pawl.

As further shown in FIG. 26, the pawls 1214 may be configured such that their respective grasping portions 1220 are biased toward one another. In one example, a resilient biasing member 1230 acts near the grasping portion 1220 of the upper pawl to promote clockwise rotation thereof, according to the illustrated view. Clockwise rotation of the upper pawl is configured to promote counterclockwise rotation of the lower pawl to bias the grasping portions 1220 toward a closed position thereof.

Separation of the grasping portions 1220 of the pawls 1214 may be generated through the latch drive 1202. For example, a knob 292 (FIG. 5) may be used to rotate a hub 1240. To accept a variety of knob configurations, the hub 1240 may be configured to accept one or more adaptors (not shown) configured to alter the size or shape of a central lumen thereof to correspond with spindles of the various knob configurations.

In one embodiment, the hub 1240 may be rotated either clockwise or counterclockwise, and regardless of the direction of rotation, the hub 1240 is configured to slide a transmission link 1250 to the right (see arrow F) in the illustrated view. Sliding of the transmission link 1250 can rotate a link arm 1260 (see arrow G) to act on the lower pawl 1214 and cause clockwise rotation of the lower pawl (see arrow H), which in turn causes counterclockwise motion of the upper pawl 1214. Having the pawls 1214 retractable with rotation of a knob is either direction further supports the goal of having the user interface of the sliding door unit 30 provide the feel of a hinged door unit.

In one embodiment, the mortise lock 1200 may be locked by actuating the deadbolt drive 1204 with a thumb turn or key cylinder. Operating the deadbolt drive 1204 to lock the mortise lock 1200 may include rotating a lock hub 1270 toward an outer edge 66 of an active door panel 42 (FIG. 5). Rotation of the lock hub 1270 may drive a transmission arm 1274 into contact with a lock cam 1278. The illustrated lock cam 1278 is pivotably mounted to the mortise box 1206. A stop end 1282 of the lock cam 1278 may be rotated into contact with the upper pawl 1214 in a manner that helps to prevent counterclockwise rotation of the upper pawl 1214 relative to the view shown in FIG. 26.

FIG. 26 also shows a suitable keeper 1290 that can be similarly attached to the active side jamb 40 as discussed above with respect to the keeper 300. Because the grasping portions 1220 of the pawls 1214 are yieldable biased toward one another, the act of closing the active door panel 42 can force the keeper 1290 between the pawls 1214 as the grasping portions 1220 are temporarily forced apart by the keeper. The leading edge 1292 of the keeper 1290 and the leading surfaces 1294 of the grasping portions 1220 are tapered to promote separation of the pawls 1214 during closure of the active door panel.

Figure 27:
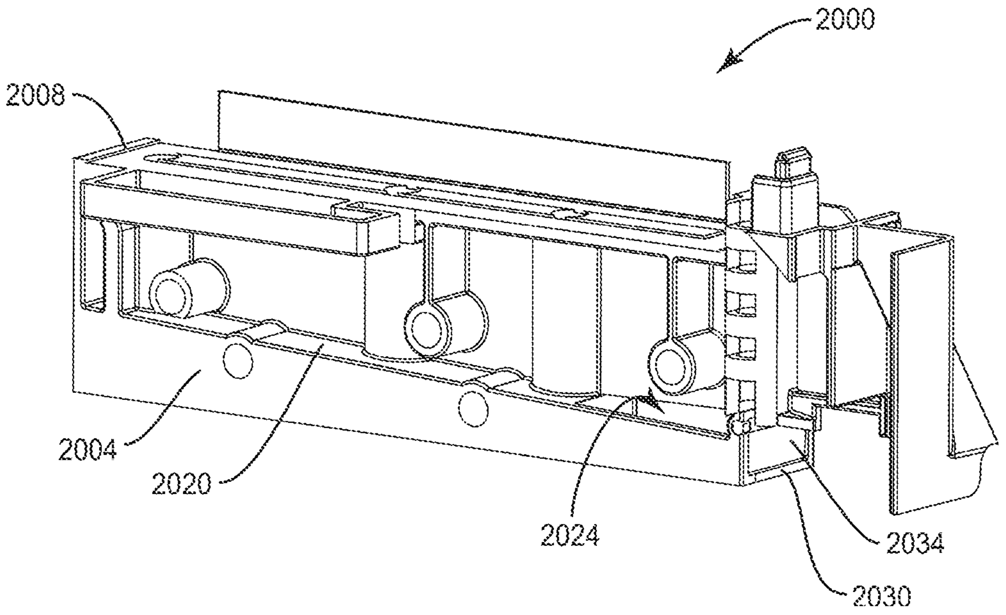
FIG. 27 is a perspective view of an optional jamb boot for use in sliding door units according to embodiments of the present disclosure.
Figure 28:
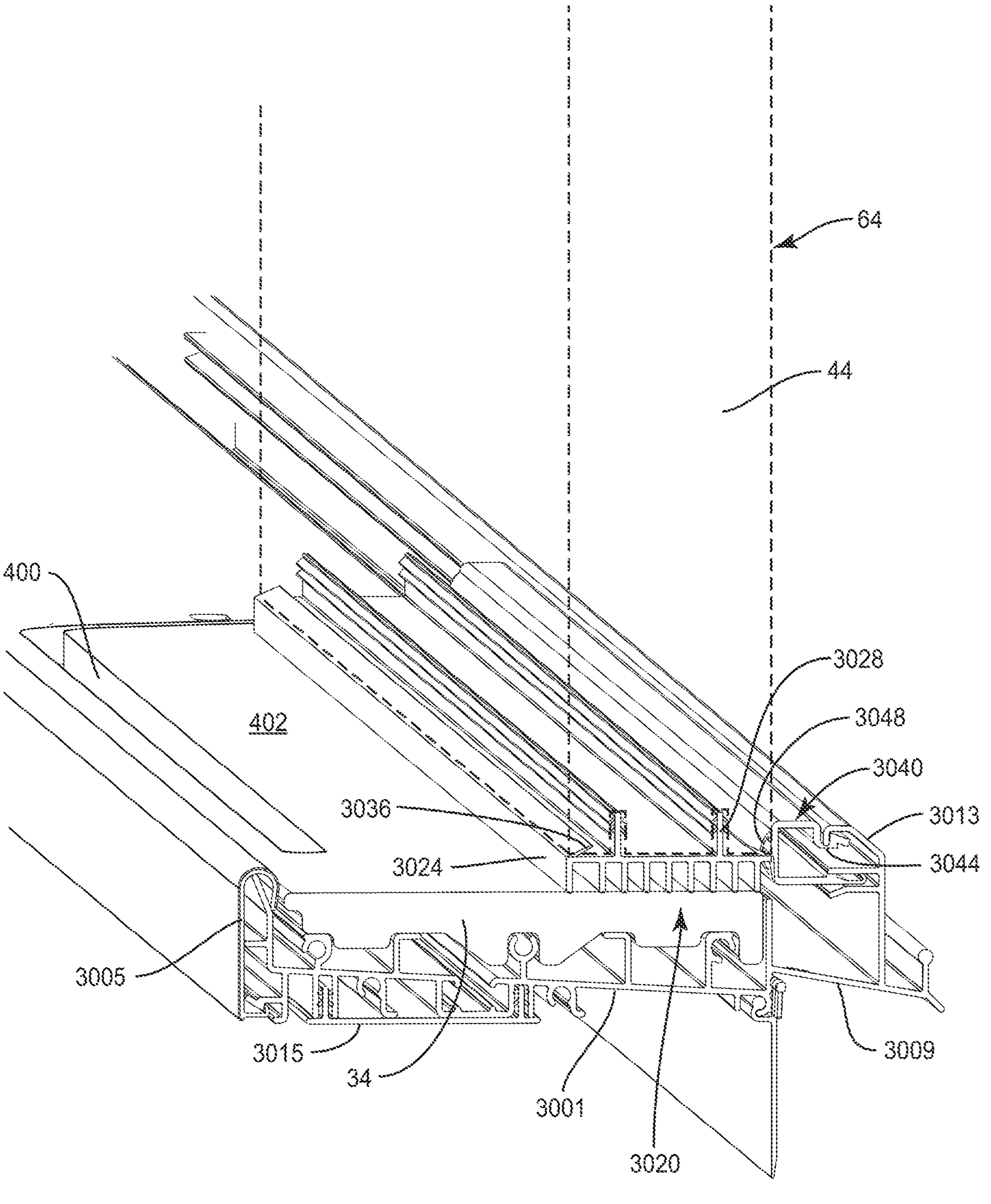

Turning to FIG. 27, a jamb boot 2000 is illustrated. The jamb boot 2000 is an optional component of the sliding door unit 30 (FIG. 3) for use at the joint between a side jamb 38, 40 and the sill 34. The jamb boot 2000 is not limited to use with the specific jambs and sills described above, but may useful with various jambs and sills as will be appreciated by one having ordinary skill in the art. FIG. 27 illustrates an exterior perspective view of the sill-facing side 2004 of the jamb boot 2000. A support surface 2008 is configured to support the bottom end of a side jamb, such as the active side jamb 40 (FIG. 3). Screws or other fasteners may be used to secure the side jamb to the jamb boot. A gasket (not shown) may be disposed between the bottom of the side jamb and the support surface 2008 of the jamb boot 2000. The sill-facing side 2004 may be fastened to an end of the sill 34 with fasteners, such as screws. A gasket (not shown) may be disposed between the sill-facing side 2004 and the sill 34.

The jamb boot 2000 is designed to assist the sill 34 with water management for avoiding undesired intrusion of water into a building having the sliding door unit 30. As discussed above, the slots 400 or other portions of the sill 34 may be configured to collect water and influence the water to drain toward the ends of the sill. In such embodiments, the jamb boot 2000 is then designed to receive the run-off water on an interior sloped surface 2020 that is tapered toward the exterior of the jamb boot. The sloped surface 2020 leads to a reservoir 2024 that also has a sloped bottom surface. Any water received in the reservoir 2024 is then designed to be channeled out an exterior opening 2030 in the reservoir. In one embodiment, a unidirectional flap 2034 covers the exterior opening 2030. The flap 2034 is configured to yield to water draining from within the reservoir 2024 of the jamb boot 2000, but the flap is designed to seal against any back pressure that seeks to force water from the exterior into the jamb boot.

Moving to FIG. 23, further details of the sill 34 are illustrated according to one embodiment. As discussed above, the sill 34 may have a guide slot 400 formed in the top surface 402 of the sill. In one embodiment, the sill 34 is supported by a substrate 3001, which may be an extruded aluminum substrate. An interior of the substrate 3001 may accept a decorative nosing cover 3005. An exterior of the substrate 3001 may be integrated with a sill extension 3009 that is configured to provide a dam 3013 to assist with water management. A caulking plate 3015 may be attached to an underside of the substrate 3001. The caulking plate 3015 is configured to provide a broad downward facing surface for receiving caulk for the purpose of adhering the substrate 3001 and sill 34 to a subfloor or sill pan (not shown).

In the industry, the fixed door panel 44 or a similarly functioning panel may be referred to as a sidelite, and a seat (not shown) may support the fixed door panel 44 and be referred to as a sidelite seat. The seat can include a support portion configured to support the bottom edge of the fixed door panel 44. The support portion is configured to interface between the bottom edge of the fixed door panel 44 and the top surface 402 of the sill 34. The support portion may join to the fixed door panel 44 using one or more kerf projections configured to fit within kerf slits formed in the bottom edge of the fixed door panel. The kerf projections may include kerf fins to form a tight fit with the kerf slits. The support portion may also include at least one sealing fin configured to form a seal with the bottom edge of the fixed door panel 44.

In addition to the support portion, the seat may also include an attachment portion (not shown) configured to position the seat relative to the sill 34. For example, the attachment portion may include a pair of resilient legs designed to snap-fit the seat into attachment with the dam 3013 of the sill extension 3009. The attachment portion may include a resilient fin, bulb or other pliable element configured to form a seal along the exterior face 64 of the fixed door panel 44. In an alternative embodiment, the seal between the face 64 of the fixed door panel 44 and the attachment portion may be moved to a seal between the bottom of the fixed door panel and the support portion adjacent to an exterior side of the support portion.

Although not shown in the figures, the attachment portion of the seat, with the resilient fin or other sealing feature, may be created without the support portion. The attachment portion could then be suitable for use as a weather-strip between the dam 3013 and the exterior face 64 of the active door panel 42 (FIG. 3) when the active door panel is in a closed position.

Having described the structure of a sliding door unit 30 according to several embodiments, creation of a sliding door unit 30 with at least the active door panel 42 that is suitable for use as a hinged door panel may also be described in terms of a new process. For example, the process may include the step of obtaining a door panel with less than 65% glazing on the face thereof and a pair of bores adjacent to one another and preformed through the panel portion of the face of the door panel. The method may conclude by slidably mounting the active door panel within a mounting frame.

Intermediate steps may include forming at least one mortise groove in the door panel adjacent to at least one of a top edge and a bottom edge of the door panel. The method may include securing a roller guide to the mortise groove, the roller guide configured to facilitate sliding motion between the door panel and the mounting frame. Additional steps may also include installing a latch in communication with at least one of the pair of bores, where the latch is capable of preventing motion between the door panel and the mounting frame along a direction parallel with the face of the door panel.

Although the above disclosure has been presented in the context of exemplary embodiments, it is to be understood that modifications and variations may be utilized without departing from the spirit and scope of the invention, as those skilled in the art will readily understand. Such modifications and variations are considered to be within the purview and scope of the appended claims and their equivalents.

The invention claimed is:

1. A housing configured to close a gap between a first door panel and a second door panel when the first door panel and the second door panel are in a closed configuration, the housing comprising:

a first side configured to attach to a first door panel;

a second side configured to attach to a second door panel; and a lock mechanism housed within the first side or the second side, the lock mechanism having an upper shoot bolt and a lower shoot bolt, the upper shoot bolt and the lower shoot bolt each having a retracted position in which the upper shoot bolt and the lower shoot bolt are disposed within the housing such that the housing is capable of translating relative to a door frame and an extended position in which the upper shoot bolt and the lower shoot bolt extend from ends of the housing such that the housing is prevented from translating, the lock mechanism configured to transition the upper shoot bolt and the lower shoot bolt from the retracted position to the extended position thereof simultaneously with one another;

wherein the lock mechanism is configured to transition the upper shoot bolt and the lower shoot bolt from the extended position to the retracted position thereof simultaneously with one another;

wherein the lock mechanism includes an actuator, the actuator having a first position in which the upper shoot bolt and the lower shoot bolt are in the retracted position and a second position in which the upper shoot bolt and the lower shoot bolt are in the extended position;

wherein the actuator has a first end portion coupled to the lock mechanism and a second end portion extending away from the first end portion, the actuator having an actuator axis extending between the first end portion and the second end portion, the housing having a longitudinal axis, the actuator axis being parallel to the longitudinal axis in the first position and the second position; and wherein the actuator has an intermediate position between the first position and the second position, the actuator axis being perpendicular to the longitudinal axis in the intermediate position.

2. The housing according to claim 1, wherein the actuator is connected to the upper shoot bolt via a first linkage and to the lower shoot bolt via a second linkage.

3. The housing according to claim 1, wherein the actuator is a flip-lever, the actuator pivoting about the first end portion as the actuator moves between the first position and the second position.

4. The housing according to claim 1, wherein in the extended position of the upper shoot bolt and the lower shoot bolt the first door panel or the second door panel is fixed relative to the door frame.

5. A door system comprising:

a door frame;

a first door panel having a first interior face;

a second door panel having a second interior face, the first door panel movable relative to the second door panel between a closed configuration in which the first interior face and the second interior face are coplanar with one another within the door frame and an open configuration in which the first interior face and the second interior face are planarly offset from one another;

an astragal having a first side attached to the first door panel and a second side attached to the second door panel, the astragal configured to close a gap between the first door panel and the second door panel in the closed configuration;

a lock mechanism housed within the first side or the second side of the astragal, the lock mechanism having an upper shoot bolt and a lower shoot bolt, the upper shoot bolt and the lower shoot bolt each having a retracted position in which the upper shoot bolt and the lower shoot bolt are disposed within the astragal such that the astragal is capable of translating relative to a door frame and an extended position in which the upper shoot bolt and the lower shoot bolt extend from ends of the astragal into the door frame such that the astragal is prevented from translating, the lock mechanism configured to transition the upper shoot bolt and the lower shoot bolt from the retracted position to the extended position thereof simultaneously with one another;

wherein the lock mechanism is configured to transition the upper shoot bolt and the lower shoot bolt from the extended position to the retracted position thereof simultaneously with one another;

wherein the lock mechanism includes an actuator, the actuator having a first position in which the upper shoot bolt and the lower shoot bolt are in the retracted position and a second position in which the upper shoot bolt and the lower shoot bolt are in the extended position;

wherein the actuator has a first end portion coupled to the lock mechanism and a second end portion extending away from the first end portion, the actuator having an actuator axis extending between the first end portion and the second end portion, the astragal having a longitudinal axis, the actuator axis being parallel to the longitudinal axis in the first position and the second position; and wherein the actuator has an intermediate position between the first position and the second position, the actuator axis being perpendicular to the longitudinal axis in the intermediate position.

6. The door system according to claim 5, wherein the actuator is connected to the upper shoot bolt via a first linkage and to the lower shoot bolt via a second linkage.

7. The door system according to claim 5, wherein the actuator is a flip-lever, the actuator pivoting about the first end portion as the actuator moves between the first position and the second position.

8. The door system according to claim 5, wherein the second door panel is fixed relative to the door frame in the closed configuration.

9. A door system comprising:

a door frame;

a first door panel having a first interior face;

a second door panel having a second interior face, the first door panel movable relative to the second door panel between a closed configuration in which the first interior face and the second interior face are coplanar with one another within the door frame and an open configuration in which the first interior face and the second interior face are planarly offset from one another;

an astragal having a first side attached to the first door panel and a second side attached to the second door panel, the astragal configured to close a gap between the first door panel and the second door panel in the closed configuration;

a lock mechanism housed within the first side or the second side of the astragal, the lock mechanism having an upper shoot bolt and a lower shoot bolt, the upper shoot bolt and the lower shoot bolt each having a retracted position in which the upper shoot bolt and the lower shoot bolt are disposed within the astragal such that the astragal is capable of translating relative to a door frame and an extended position in which the upper shoot bolt and the lower shoot bolt extend from ends of the astragal into the door frame such that the astragal is prevented from translating, the lock mechanism configured to transition the upper shoot bolt and the lower shoot bolt from the retracted position to the extended position thereof simultaneously with one another;

wherein the first door panel defines a through bore on a side of the first door panel opposite the astragal, the door system further comprising:

a latch, comprising:

a case;

a hub configured to be positioned in the through bore of the first door panel, the hub configured to receive a spindle of a handle set common to hinged entryway doors such that rotation of the spindle actuates the hub; and at least one pair of pawls pivotably mounted within the case, the at least one pair of pawls arranged within the case to pivot about a vertical axis in response to actuation of the hub, the at least one pair of pawls is configured to grip a keeper and selectively prevent sliding movement between the first door panel and the door frame.

10. A door system comprising:

a door frame having a header and a sill;

a first door panel having a first interior face;

a second door panel having a second interior face, the first door panel movable relative to the second door panel between a closed configuration in which the first interior face and the second interior face are coplanar with one another;

an astragal having a first side attached to the first door panel and a second side attached to the second door panel, the astragal configured to close a gap between the first door panel and the second door panel in the closed configuration;

a lock mechanism housed within the first side or the second side of the astragal, the lock mechanism having an upper shoot bolt and a lower shoot bolt, the upper shoot bolt and the lower shoot bolt each having a retracted position and an extended position in which the upper shoot bolt extends into the header and the lower shoot bolt extends into the sill such that the astragal is prevented from translating, the lock mechanism configured to transition the upper shoot bolt and the lower shoot bolt from the retracted position to the extended position thereof simultaneously with one another;

wherein the lock mechanism includes an actuator, the actuator having a first position in which the upper shoot bolt and the lower shoot bolt are in the retracted position and a second position in which the upper shoot bolt and the lower shoot bolt are in the extended position; and the actuator having an actuator axis extending between the first end portion and the second end portion, the astragal having a longitudinal axis, the actuator axis being parallel to the longitudinal axis in the first position and the second position; and wherein the actuator has an intermediate position between the first position and the second position, the actuator axis being perpendicular to the longitudinal axis of the astragal in the intermediate position.

* * * * *